United States Patent
Kwon et al.

(10) Patent No.: US 9,392,582 B2
(45) Date of Patent: Jul. 12, 2016

(54) APPARATUS AND METHOD FOR TRANSMITTING/RECEIVING ACTIVATION INDICATOR REGARDING COMPONENT CARRIER IN WIRELESS COMMUNICATION SYSTEM

(71) Applicant: PANTECH CO., LTD., Seoul (KR)

(72) Inventors: Ki Bum Kwon, Ansan-si (KR); Myung Cheul Jung, Seoul (KR); Sung Jin Seo, Seoul (KR)

(73) Assignee: Pantech Co., Ltd., Seoul (KR)

( * ) Notice: Subject to any disclaimer, the term of this patent is extended or adjusted under 35 U.S.C. 154(b) by 235 days.

(21) Appl. No.: 13/875,808

(22) Filed: May 2, 2013

(65) Prior Publication Data

US 2013/0242790 A1 Sep. 19, 2013

Related U.S. Application Data

(62) Division of application No. 12/916,203, filed on Oct. 29, 2010, now Pat. No. 8,538,411.

(30) Foreign Application Priority Data

Oct. 30, 2009 (KR) .......................... 10-2009-0104586
Sep. 8, 2010 (KR) .......................... 10-2010-0088151

(51) Int. Cl.
*H04W 72/04* (2009.01)
*H04W 48/08* (2009.01)
(Continued)

(52) U.S. Cl.
CPC .......... *H04W 72/0406* (2013.01); *H04W 48/08* (2013.01); *H04W 72/04* (2013.01); *H04W 76/04* (2013.01); *H04W 28/06* (2013.01); *Y02B 60/50* (2013.01)

(58) Field of Classification Search
CPC ...... H04W 28/06; H04W 48/08; H04W 72/04
USPC ........ 370/252, 311, 329; 455/454, 509, 422.1
See application file for complete search history.

(56) References Cited

U.S. PATENT DOCUMENTS 8,861,449 B2   10/2014  Wager et al.
2009/0163211 A1*  6/2009  Kitazoe ............. H04W 74/0866
                                                                        455/436

(Continued)

FOREIGN PATENT DOCUMENTS

JP         2012-519984        8/2012
WO       2007/148707      12/2007

(Continued)

OTHER PUBLICATIONS

International Search Report dated Aug. 1, 2011 for Application No. PCT/KR2010/007549 , which corresponds to U.S. Appl. No. 12/916,203.

(Continued)

*Primary Examiner* — Qun Shen
(74) *Attorney, Agent, or Firm* — H.C. Park & Associates, PLC

(57) ABSTRACT

A method for supporting activation/deactivation of serving cells by a base station (eNB) in a wireless communication system provides decreased overhead and decreased power consumption for a user equipment (UE). The method includes configuring M supportable serving cells in the UE, configuring an indicator indicating activation/deactivation of each of the M serving cells, configuring a medium access control (MAC) message which includes a MAC control element (CE) and a logical channel identifier (LCID), the MAC CE including the indicator configured for each of the M serving cells and having a length corresponding to an integer multiple of 8 bits, the LCID indicating that the MAC CE includes the indicator indicating activation/deactivation of each serving cell, and transmitting the configured MAC message to the UE. Accordingly, a control channel or data channel regarding a component carrier is selectively received depending on whether the component carrier is activated.

14 Claims, 35 Drawing Sheets

(51) Int. Cl.
*H04W 76/04* (2009.01)
*H04W 28/06* (2009.01)

(56) References Cited

U.S. PATENT DOCUMENTS

| | | | |
|---|---|---|---|
| 2009/0196196 | A1 | 8/2009 | Ghosh et al. |
| 2009/0257387 | A1* | 10/2009 | Gholmieh et al. ............ 370/329 |
| 2010/0098011 | A1 | 4/2010 | Pelletier et al. |
| 2010/0118720 | A1* | 5/2010 | Gauvreau ........... H04W 72/048 370/252 |
| 2010/0208749 | A1 | 8/2010 | Chun et al. |
| 2010/0234037 | A1* | 9/2010 | Terry ................... H04L 1/0023 455/450 |
| 2010/0278176 | A1* | 11/2010 | Faniuolo ................ H04L 47/35 370/389 |
| 2010/0302964 | A1* | 12/2010 | Guo .............. 370/252 |
| 2010/0303011 | A1* | 12/2010 | Pan et al. ....................... 370/328 |
| 2010/0309788 | A1 | 12/2010 | Ho et al. |
| 2011/0038296 | A1 | 2/2011 | Yi et al. |
| 2011/0045863 | A1* | 2/2011 | Lee ....................... H04L 5/0007 455/517 |
| 2011/0243066 | A1 | 10/2011 | Nayeb Nazar et al. |
| 2011/0292851 | A1 | 12/2011 | Fong et al. |
| 2011/0305290 | A1 | 12/2011 | Kim et al. |
| 2012/0178445 | A1 | 7/2012 | Dalsgaard et al. |

FOREIGN PATENT DOCUMENTS

| | | |
|---|---|---|
| WO | 2009/086696 | 7/2009 |
| WO | 2009/099974 | 8/2009 |
| WO | 2010/126154 | 11/2010 |

OTHER PUBLICATIONS

NEC, R2-094624, "Details on Carrier Aggregation Signaling", 3GPP TSG-RAN WG2 #67, Shenzhen, China, Aug. 24-28, 2009.
NEC, R2-094626, "Mobility and Carrier Aggregation Signaling", 3GPP TSG-RAN WG2 #67, Shenzhen, China, Aug. 24-28, 2009.
Non-Final Office Action of U.S. Appl. No. 12/916,203 dated Dec. 20, 2012.
Notice of Allowance of U.S. Appl. No. 12/916,203 dated May 16, 2013.
Ericsson, "CC activation and deactivation message," 3GPP TSG-RAN WG2 #70, Tdoc R2-103088, May 10-14, 2010, Montreal, Canada.
Ericsson, ST-Ericsson, "Activation and deactivation of component carriers," 3GPP TSG-RAN WG2 #68, Tdoc R2-096752, Oct. 9-13, 2009, Jeju, Korea.
MediaTek, "Details on the activation/deactivation MAC CE", 3GPP TSG-RAN WG2 meeting #69bis, R2-102108, Apr. 12-16, 2010, Beijing, China.
ZTE, "Primary and Secondary PDCCH Design for LTE-A", 3GPP TSG-RAN WG1 meeting #57, R1-091707, May 4-8, 2009, San Francisco, US.
Notice of Allowance mailed on Mar. 4, 2015, in U.S. Appl. No. 13/875,869.
NTT Docomo, R1-090312, " Initial Access Procedure for Asymmetric Wider Bandwidth in LTE-Advanced", 3GPP TSG RAN WG1 "#55bis", Ljubljana, Slovenia, Jan. 12-16, 2009.
Huwei, R1-083706, "DL/UL Asymmetric Carrier Aggregation", 3GPP TSG-RAN-WG1 "#54bis", Prague Czech, Sep. 29-Oct. 3, 2008.
NEC Group, R1-084268, "DL/UL Resource Signalling for LTE-Advanced System", TSG-RAN WG1 #55, Prague, Czech Republic, Nov. 10-14, 2008.
Non-Final Office Action of U.S. Appl. No. 13/965,837 dated Jun. 5, 2015.

\* cited by examiner

SERVING CELL INDEX OF
SSC SUPPORTABLE IN SYSTEM

APPARATUS AND METHOD FOR TRANSMITTING/RECEIVING ACTIVATION INDICATOR REGARDING COMPONENT CARRIER IN WIRELESS COMMUNICATION SYSTEM

This application is a divisional of U.S. patent application Ser. No. 12/916,203, filed on Oct. 29, 2010, and claims priority from and the benefit under 35 U.S.C. §119(a) of Korean Patent Application No. 10-2009-0104586, filed on Oct. 30, 2009, and Korean Patent Application No. 10-2010-0088151, filed on Sep. 8, 2010, the disclosures of which are incorporated herein by reference for all purposes.

BACKGROUND

1. Field

The following description relates to wireless communications, and more particularly, to an apparatus and method for constructing an activation group regarding a component carrier in a wireless communication system having a plurality of component carriers and for transmitting and receiving activation information generated on the basis of the constructed activation group.

2. Discussion of the Background

Next generation wireless communication systems support a high data rate. For this, various techniques, such as multiple input multiple output (MIMO), cooperative multiple point transmission (CoMP), relay, etc., have been researched, but another solution may be to increase a bandwidth.

However, currently, a frequency resource is in a saturation state, and various schemes are partially used in a wide frequency band. For this reason, in order to ensure a broadband bandwidth in order to satisfy a higher data rate, a system is designed to satisfy a basic requirement which requires separate bands capable of operating respective independent systems, and a carrier aggregation (CA) is introduced. In concept, the CA aggregates a plurality of bands into one system. In this case, a band that can be independently managed is defined as a component carrier (CC).

SUMMARY

Exemplary embodiments of the present invention provide a system including a plurality of component carriers satisfying a service requirement in a next generation wireless communication system, and a method for the system.

Exemplary embodiments of the present invention provide an apparatus and method for configuring an activation group in correspondence with specific information in a wireless communication system using a plurality of component carriers.

Exemplary embodiments of the present invention provide an apparatus and method for generating an activation indicator on the basis of an activation group configured in correspondence with specific information in a wireless communication system using a plurality of component carriers.

Exemplary embodiments of the present invention provide an apparatus and method for indicating activation and deactivation of a component carrier configured in correspondence with specific information in a wireless communication system using a plurality of component carriers.

Exemplary embodiments of the present invention provide an apparatus and method for transmitting and receiving an activation indicator indicating activation of a selected component carrier in a wireless communication system using a plurality of component carriers.

Exemplary embodiments of the present invention provide an apparatus and method for transmitting and receiving an activation indicator indicating deactivation of a selected component carrier in a wireless communication system using a plurality of component carriers.

Exemplary embodiments of the present invention provide an apparatus and method for transmitting and receiving an activation indicator indicating activation or deactivation of a selected component carrier by constructing the indicator in a format of a bitmap having a predetermined size in a wireless communication system using a plurality of component carriers.

Exemplary embodiments of the present invention provide an apparatus and method for transmitting and receiving an activation indicator indicating activation or deactivation of a secondary serving cell (SSC), to which a system information block type 2 (SIB2) connection is established, by constructing the indicator to have the same length as information indicating a component carrier index in a wireless communication system.

Exemplary embodiments of the present invention provide an apparatus and method for transmitting and receiving an activation indicator indicating activation or deactivation of an SSC, to which an SIB2 connection is established, by using medium access control (MAC) signaling in a wireless communication system.

Additional features of the invention will be set forth in the description which follows, and in part will be apparent from the description, or may be learned by practice of the invention.

An exemplary embodiment provides a method for supporting activation/deactivation of serving cells by a base station (eNB) in a wireless communication system, the method including configuring M supportable serving cells in a user equipment (UE), configuring an indicator indicating activation/deactivation of each of the M serving cells, configuring a medium access control (MAC) message which includes a MAC control element (CE) and a logical channel identifier (LCID), the MAC CE including the indicator configured for each of the M serving cells and having a length corresponding to an integer multiple of 8 bits, the LCID indicating that the MAC CE includes the indicator indicating activation/deactivation of each serving cell, and transmitting the configured MAC message to the UE.

An exemplary embodiment provides a method for supporting activation/deactivation of serving cells by a user equipment (UE) in a wireless communication system, the method including receiving a medium access control (MAC) message from a base station (eNB), confirming by a logical channel identifier (LCID) that an indicator is included in the received MAC message, and confirming that the indicator indicates activation/deactivation of each of M serving cells configured in the UE by using a MAC control element (MAC CE) having a length corresponding to an integer multiple of 8 bits, and receiving a downlink control channel or a downlink data channel from the eNB or transmitting an uplink data channel to the eNB by using an activated serving cell based on the confirmed indicator.

An exemplary embodiment provides a base station (eNB) to support activation/deactivation of serving cells in a wireless communication system, the eNB including an activation group configuration unit to configure M supportable serving cells in a user equipment (UE), an activation indicator generation unit to generate an indicator indicating activation/ deactivation of each of the M serving cells, a message transmission unit to configure a medium access control (MAC) message and to transmit the configured MAC message to the UE, the MAC message including a MAC control element (MAC CE) and a logical channel identifier (LCID), the MAC CE including the indicator configured for each of the M serving cells and having a length corresponding to an integer multiple of 8 bits, the LCID indicating that the MAC CE includes the indicator.

An exemplary embodiment provides a user equipment (UE) to support activation/deactivation of serving cells in a wireless communication system, the user equipment including a reception processing unit to receive a medium access control (MAC) message, an activation group confirmation unit to confirm by logical channel identifier (LCID) that an indicator is included in the received MAC message, and to confirm that the indicator indicates activation/deactivation of each of M serving cells configured in the UE by using a MAC control element (CE) having a length corresponding to an integer multiple of 8 bits, and an information analysis unit to receive a downlink control channel or a downlink data channel, or to transmit an uplink data channel, by using an activated serving cell based on the confirmed indicator.

An exemplary embodiment provides a method for supporting activation/deactivation of component carriers by a base station (eNB) in a wireless communication system supporting multi component carriers, the method including configuring M supportable component carrier (CC)s in a user equipment (UE), configuring an indicator indicating activation/deactivation of each of the M CCs, configuring a medium access control (MAC) message which includes a MAC control element (CE) and a logical channel identifier (LCID), the MAC CE including the indicator configured for each of the M CCs and having a length corresponding to an integer multiple of 8 bits, the LCID indicating that the MAC CE includes the indicator indicating activation/deactivation of each CC, and transmitting the configured MAC message to the UE. The CC is a cell to transmit and receive information between the eNB and the UE, that the cell has a linkage between uplink CC and downlink CC.

An exemplary embodiment provides a method for supporting activation/deactivation of component carriers by a user equipment (UE) in a wireless communication system supporting multi component carriers, the method including receiving a medium access control (MAC) message from a base station (eNB), confirming by a logical channel identifier (LCID) that an indicator is included in the received MAC message, and confirming that the indicator indicates activation/deactivation of each of M component carrier (CC)s configured in the UE by using a MAC control element (MAC CE) having a length corresponding to an integer multiple of 8 bits, and receiving a downlink control channel or a downlink data channel from the eNB or transmitting an uplink data channel to the eNB by using an activated CC based on the confirmed indicator. The CC is a cell to transmit and receive information between the eNB and the UE, that the cell has a linkage between uplink CC and downlink CC.

An exemplary embodiment provides a base station (eNB) to support activation/deactivation of component carrier (CC)s in a wireless communication system, the eNB including an activation group configuration unit to configure M supportable component carrier (CC)s in a user equipment (UE), an activation indicator generation unit to generate an indicator indicating activation/deactivation of each of the M component carrier (CC)s, a message transmission unit to configure a medium access control (MAC) message and to transmit the configured MAC message to the UE, the MAC message including a MAC control element (MAC CE) and a logical channel identifier (LCID), the MAC CE including the indicator configured for each of the M component carrier (CC)s and having a length corresponding to an integer multiple of 8 bits, the LCID indicating that the MAC CE includes the indicator. The CC is a cell to transmit and receive information between the eNB and the UE, that the cell has a linkage between uplink CC and downlink CC.

An exemplary embodiment provides a user equipment (UE) to support activation/deactivation of component carrier (CC)s in a wireless communication system, the user equipment including a reception processing unit to receive a medium access control (MAC) message, an activation group confirmation unit to confirm by logical channel identifier (LCID) that an indicator is included in the received MAC message, and to confirm that the indicator indicates activation/deactivation of each of M component carrier (CC)s configured in the UE by using a MAC control element (CE) having a length corresponding to an integer multiple of 8 bits, and an information analysis unit to receive a downlink control channel or a downlink data channel, or to transmit an uplink data channel, by using an activated component carrier (CC) based on the confirmed indicator. The CC is a cell to transmit and receive information between the eNB and the UE, that the cell has a linkage between uplink CC and downlink CC.

An exemplary embodiment provides a method for supporting activation/deactivation of component carrier (CC)s by a base station (eNB) in a wireless communication system using a plurality of CCs having frequency bands that can be independently managed, the method including determining, for each of the CCs, activation to instruct monitoring for receiving a control channel and a data channel or at least one of the control channel and the data channel or deactivation to instruct a stop of the monitoring for receiving the control channel and the data channel, setting the determined activation or deactivation to a 1-bit indicator, wherein the activation is set to 1 and the deactivation is set to 0, and transmitting medium access control (MAC) signaling which includes the indicator for each of the CCs in a bit-stream having a predetermined length, to a user equipment (UE).

An exemplary embodiment provides a method for supporting activation/deactivation of component carrier (CC)s by a user equipment (UE) in a wireless communication system using a plurality of CCs having frequency bands that can be independently managed, the method including receiving medium access control (MAC) signaling which includes an indicator configured for each of the CCs in a bit-stream having a predetermined length, confirming the indicator set for each of the CCs in the bit-stream having the predetermined length, activating a corresponding CC if the confirmed indicator is 1 or deactivating the corresponding CC if the confirmed indicator is 0, and receiving a control channel and a data channel or at least one of the control channel and the data channel by monitoring the activated CC or not receiving the control channel and the data channel by stopping monitoring of the deactivated CC.

An exemplary embodiment provides a base station (eNB) for supporting activation/deactivation of component carrier (CC)s in a wireless communication system using a plurality of CCs having frequency bands that can be independently managed, the eNB including a controller to determine, for each of the CCs, activation to instruct monitoring for receiving a control channel and a data channel or at least one of the control channel and the data channel or deactivation to instruct a stop of the monitoring for receiving the control channel and the data channel, and to set the determined activation or deactivation to a 1-bit indicator, wherein the activation is set to 1 and the deactivation is set to 0, and a transceiver medium access control (MAC) signaling which includes the indicator for each of the CCs in a bit-stream having a predetermined length, to a user equipment (UE).

An exemplary embodiment provides a user equipment (UE) for supporting activation/deactivation of component carrier (CC)s in a wireless communication system using a plurality of CCs having frequency bands that can be independently managed, the UE including a reception processing unit to receive medium access control (MAC) signaling which includes an indicator configured for each of the CCs in a bit-stream having a predetermined length, an activation group confirmation unit to confirm the indicator set for each of the CCs in the bit-stream having the predetermined length, and to activate a corresponding CC if the confirmed indicator is 1 or deactivate the corresponding CC if the confirmed indicator is 0, and an information analysis unit to receive a control channel and a data channel or at least one of the control channel and the data channel by monitoring the activated CC or not to receive the control channel and the data channel by stopping monitoring of the deactivated CC.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
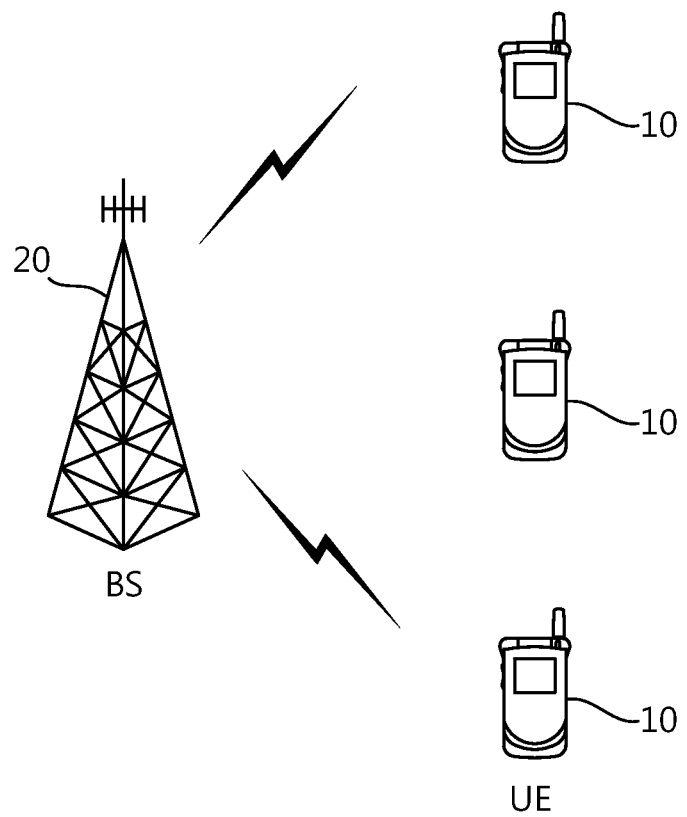
FIG. 1 shows a wireless communication system according to an exemplary embodiment of the present invention.

Throughout the drawings and the detailed description, unless otherwise described, the same drawing reference numerals are understood to refer to the same elements, features, and structures. The relative size and depiction of these elements may be exaggerated for clarity, illustration, and convenience.

DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 shows a wireless communication system according to an exemplary embodiment of the present invention is applied. The wireless communication system can be widely deployed to provide a variety of communication services, such as voices, packet data, etc. Referring to FIG. 1, the wireless communication system includes a user equipment (UE) 10 and an evolved Node B (eNB) 20. The UE 10 and the eNB 20 use various power allocation mechanisms described below.

The UE 10 collectively represents all user terminals used in wireless communication and shall be construed as including not only a user equipment (UE) used in Wideband Code Division Multiple Access (WCDMA), Long Term Evolution (LTE), High Speed Packet Access (HSPA), etc., but also a mobile station (MS), a user terminal (UT), a subscriber station (SS), a wireless device, etc., used in Global System for Mobile Communication (GSM).

The eNB 20 may be a cell and generally refers to a fixed station that communicates with the UE 10 and may be referred to as another terminology, such as a base station (BS), a node-B, a base transceiver system (BTS), an access point (AP), a relay, femto BS, etc.

That is, the eNB 20 collectively represents some frequency regions covered by an eNB in Code Division Multiple Access (CDMA), a NodeB in WCDMA, etc., and shall be construed as including all various coverage areas, such as a mega cell, a macro cell, a micro cell, a pico cell, a femto cell, etc.

The UE 10 and the eNB 20 are transmitting and receiving entities used to implement technical features or technical ideas described herein, and are not constrained by a specific term or name.

There is no restriction on a multiple access scheme used in the wireless communication system. Various multiple access schemes can be used, such as CDMA, time division multiple access (TDMA), frequency division multiple access (FDMA), orthogonal frequency division multiple access (OFDMA), OFDM-FDMA, OFDM-TDMA, and OFDM-CDMA.

Hereinafter, a downlink represents communication from the eNB 20 to the UE 10, and an uplink represents communication from the UE 10 to the eNB 20. In this case, in the downlink, a transmitter may be a part of the eNB 20, and a receiver may be a part of the UE 10. Further, in the uplink, the transmitter may be a part of the UE 10, and the receiver may be a part of the eNB 20. In some cases, the downlink may represent communication from the UE 10 to the eNB 20, and the uplink may represent communication from the eNB 20 to the UE 10. In this case, in the downlink, the transmitter may be a part of the UE 10, and the receiver may be a part of the eNB 20. Further, in the uplink, the transmitter may be a part of the eNB 20, and the receiver may be a part of the UE 10. The downlink may also be referred to as a forward link, and the uplink may also be referred to as a reverse link.

Uplink transmission and downlink transmission may use a time division duplex (TDD) scheme, which performs transmission by using different times, or may use a frequency division duplex (FDD) scheme, which performs transmission by using different frequencies.

An exemplary embodiment of the present invention can be used in resource assignments, such as asynchronous wireless communication evolved to LTE and LTE-advanced via GSM, WCDMA, and HSPA, and synchronous wireless communication evolved to CDMA, CDMA-2000, and Ultra-Mobile Broadband (UMB). However, aspects of the present invention are not limited to a specific wireless communication field and shall be construed as including all technical fields to which the technical features described herein can be applied.

A method for supporting a high data rate in a next generation wireless communication system according to aspects of the present invention allows the UE 10 or the eNB 20 to ensure a transmission/reception broadband bandwidth in uplink and downlink by using a plurality of component carriers (CCs). The plurality of CCs can be configured as one system band or system carrier. One CC can be regarded as one wireless communication band before using a carrier aggregation.

Figure 2:
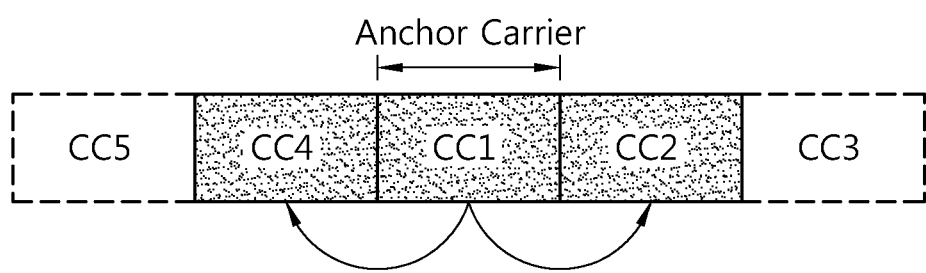
FIG. 2 shows a case of simultaneously using 5 CCs having a frequency band of 20 MHz or lower in a wireless communication system according to an exemplary embodiment of the present invention.

FIG. 2 shows a case of simultaneously using 5 CCs having a frequency band of 20 MHz or lower in a wireless communication system to an exemplary embodiment of the present invention. FIG. 2 shows the concept of frequency extension in a carrier aggregation environment.

Referring to FIG. 2, the UE 10 can be camped on through all CCs, i.e., a CC1 to a CC5. If the UE 10 is camped on, the UE 10 establishes synchronization to the eNB 20, receives basic control information for communication with the eNB 20, and communication is possible in a specific frequency band. The basic control information includes a master information block (MIB), such as a physical broadcast channel (PBCH), and a system information block (SIB), such as a physical downlink shared channel (PDSCH). In particular, in case of an SIB type 2 (SIB2), an uplink (UL) cell bandwidth, a random access parameter, and a UL power control parameter are present. Therefore, if the UE 10 is camped on the eNB 20, a parameter for using a random access channel (RACH) is received.

In addition, the UE 10 can basically perform random access to all CCs, i.e., the CC1 to the CC5. In particular, the UE 10 may perform random access first to an LTE CC which has a high possibility of being used as an anchor carrier. The anchor carrier may also be referred to as a primary component carrier (PCC). The remaining CCs other than the PCC may also be referred to as a secondary component carrier (SCC). The PCC and the SCC are determined for each UE. For example, for a first UE, the CC1 may be the PCC and the remaining CCs may be the SCCs, and for a second UE, the CC3 may be the PCC and the remaining CCs may be the SCCs.

Meanwhile, the anchor carrier may be defined as one of the CCs having all or some functions described below.

Initial synchronization between a cell and a UE and synchronization maintenance

Random access

System information reception for all or some CCs

Criterion on radio link failure (RLF) determination

Security related setup and management between the cell and the UE

Non-access stratum (NAS) mobility setup and management

Criterion and control of a discontinuous reception (DRX) operation for all or some CCs In addition, the anchor carrier may be configured in a cell unit, a user unit, or a user group unit. The anchor carrier may also be referred to as a serving cell, a primary serving cell (PSC), a special cell, etc. An anchor CC, i.e., the CC1, may be used as a criterion that indicates which carrier around the CC1 is in association with or communication with the UE and that reports which carrier is activated or deactivated.

Exemplary embodiments of the present invention provide an apparatus and method for constructing and assigning an activation group for a wireless transmission/reception operation of a UE by considering a device configuration condition of the UE, required service quality of an application program (e.g., an Internet Protocol (IP) based voice telephony (i.e., Voice over IP (VoIP)), a video streaming service, a file transfer, web surfing, etc.), an amount of power consumption, user location information, a shadow area, a frequency selective channel, etc.

The eNB 20 may configure an activation group including at least one CC among all CCs that can be received by the UE 10, and may transmit information for the activation group to the UE 10. This process is performed according to a type and criterion to be described below.

This specific activation group can be classified into a control information activation (sub) group that includes one group according to a CC including control information for the UE and a data information activation (sub) group that includes one group according to a CC including data information for the UE. The UE receives a CC of the control information activation group or a CC of the data information activation group. A corresponding CC is activated in order for the UE to receive the CC. If the CC belongs to the control information activation group or the data information activation group, the CC is activated. On the contrary, when the CC belongs neither to the control information activation group nor to the data information activation group, the CC is deactivated.

The eNB may indicate activation/deactivation of a CC by including or excluding the CC to or from the control information activation group or the data information activation group. Information indicating whether a specific CC belongs to the control information activation group or the data information activation group is referred to as an activation indicator.

Figure 3:
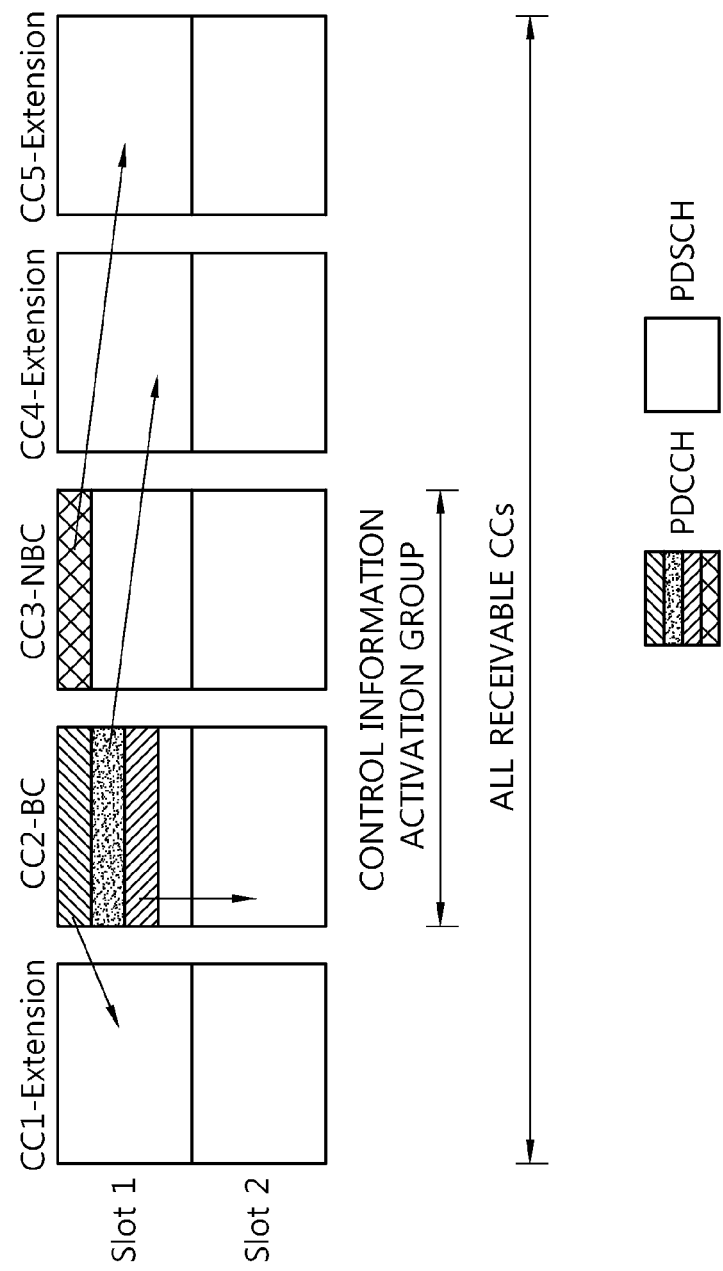
FIG. 3 shows a downlink control information activation group according to an exemplary embodiment of the present invention.

FIG. 3 shows a downlink control information activation group according to an exemplary embodiment of the present invention. Referring to FIG. 3, signals are transmitted in a radio frame unit in each of all CCs, i.e., a CC1 to a CC5. In this case, the radio frame may consist of 10 subframes, and one subframe may consist of two consecutive slots, i.e., a slot 1 and a slot 2.

In a downlink scenario, the first three (or fewer) OFDM symbols of the slot 1 in the subframe correspond to a control region to which a physical downlink control channel (PDCCH) is assigned, and the remaining OFDM symbols correspond to a data region to which a physical downlink shared channel (PDSCH) is assigned. In addition to the PDCCH, a control channel, such as a physical control format indicator channel (PCFICH), a physical hybrid automatic repeat request (HARM) indicator channel (PHICH), etc., can be assigned to the control region.

The UE 10 may decode control information transmitted through the PDCCH and thereafter may read data information transmitted through the PDSCH on the basis of the decoded control information. In this case, the control information includes 3 OFDM symbols according to an exemplary embodiment of the present invention. Meanwhile, the number of OFDM symbols included in the control region in the subframe can be known through the PCFICH.

The UE 10 may decode control information transmitted through the PDCCH of each CC in downlink in the presence of downlink control information (DCI), and may read data information transmitted through the PDSCH of each CC of downlink on the basis of the decoded control information.

A plurality of PDCCHs multiplexed for the plurality of UE 10 may be transmitted in the control region. The PDCCH is used to carry the DCI, such as scheduling determination and power control commands. More specifically, the DCI may include control information, such as downlink scheduling assignments, uplink scheduling grants, power control commands, etc. Another type of control information corresponds to a size of another DCI message. Therefore, the DCI can be identified with a different DCI format. In this case, the DCI format corresponds to a message size and usage.

One PDCCH carries one message through one of the DCI formats. Since the plurality of UEs 10 can be simultaneously scheduled on uplink and downlink, a plurality of scheduling messages can be transmitted in each subframe. Since the respective scheduling messages are transmitted on separate PDCCHs, the plurality of PDCCHs can be simultaneously transmitted in each eNB 20.

Referring again to FIG. 3, the DCI format of the PDCCH of each CC may transmit control information, such as uplink grants and downlink grants, for a CC having the DCI format, e.g., a CC which is the same as the CC2 of FIG. 3. In addition, the DCI format of the PDCCH of each CC may transmit control information, such as uplink grants and downlink grants, not only for a CC having a DCI format of a PDCCH of a specific CC, i.e., a CC which is the same as the CC2, but also at least one of other CCs, i.e., the CC1 and the CC3.

The DCI format of the PDCCH of each CC may transmit control information, such as uplink grants and downlink assignments, for only a CC (i.e., the CC3) having a DCI format of a PDCCH of a specific CC and at least one another CC (i.e., the CC5). In this case, the DCI format exists for each of a plurality of CCs to transmit control information of the respective CCs through the PDCCH.

In the wireless communication system, among all receivable CCs, i.e., the CC1 to the CC5, the eNB 20 determines a CC that is the same as the CC having the DCI format for the UE 10 or CCs (i.e., the CC2 and the CC3) that include control information (i.e., PDCCH) of at least one other CCs as a control information activation group (also referred to as a PDCCH active set), and reports information on the PDCCH active set to the UE 10. The PDCCH active set may also be referred to as a PDCCH monitoring set.

Therefore, the UE 10 may receive control information (i.e., PDCCH) on a CC in the PDCCH active set, and thereafter may confirm a location of the PDSCH transmitted to the UE 10 by analyzing information in the control information (i.e., PDCCH), and confirm data information (i.e., PDSCH) of the location indicated by the control information (i.e., PDCCH).

Figure 4:
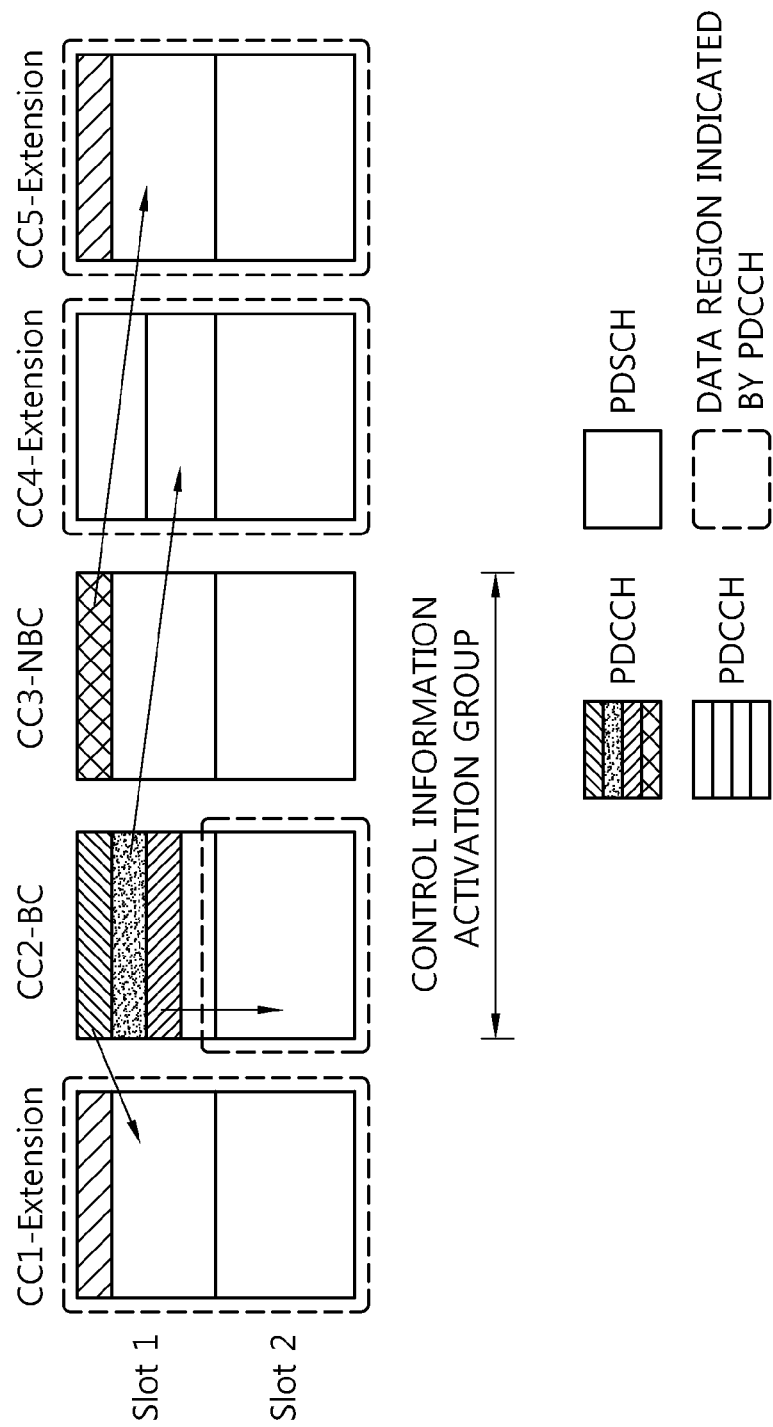
FIG. 4 shows a case where a missing region is generated when data is received using the control information activation indicator of FIG. 3.

FIG. 4 shows a case in which a missing region is generated if data is received using a control information activation indicator of FIG. 3.

A location indicated by one control information (i.e., PDCCH) may be one of all CCs, i.e., a CC1 to a CC5, which can be received by the UE 10, and thus the UE 10 performs a reception process for all CCs, i.e., the CC1 to the CC5. In this case, since the reception process is performed on all CCs, unnecessary battery consumption may occur in the UE 10.

For example, if the CCs respectively use bands of 700 MHz, 1.9 GHz, 2.1 GHz, 3 GHz, and 5 GHz, the UE 10 must perform the reception process for all frequency bands.

Meanwhile, if the eNB 20 configures the control information activation group as shown in FIG. 3 by considering unnecessary power consumption and transmits the configured control information activation group to the UE 10, the UE 10 may receive control information (i.e., PDCCH) regarding a CC of the control information activation group, and thereafter confirm a location of data information (i.e., PDSCH) transmitted to the UE 10 by analyzing information included in the control information (i.e., PDCCH) and confirm data information (i.e., PDSCH) of the location indicated by the control information (i.e., PDCCH).

The UE 10 may confirm the location of the data information transmitted to the UE 10 if blind coding is performed on both a common search space and a UE-specific search space in a control region of CCs (i.e., the CC2 and the CC3) belonging to the control information activation group. The UE 10 may reduce a range of CCs to be blind decoded by using the control information activation group received from the eNB 20. The number of blind decoding attempts performed by the UE 10 to receive the control information is linearly in proportion to the number of CCs included in the control information activation group.

Meanwhile, the UE 10 may receive the control information according to predefined resources and transmission schemes (i.e., predefined mapping from previous signaling) on the basis of an assignment location of previous control information, an assignment location of previous data, etc.

Therefore, exemplary embodiments of the present invention includes a method for configuring the control information activation group and the data information activation group in downlink and for transmitting information on the configured activation groups to the UE in the wireless communication system.

Figure 5:
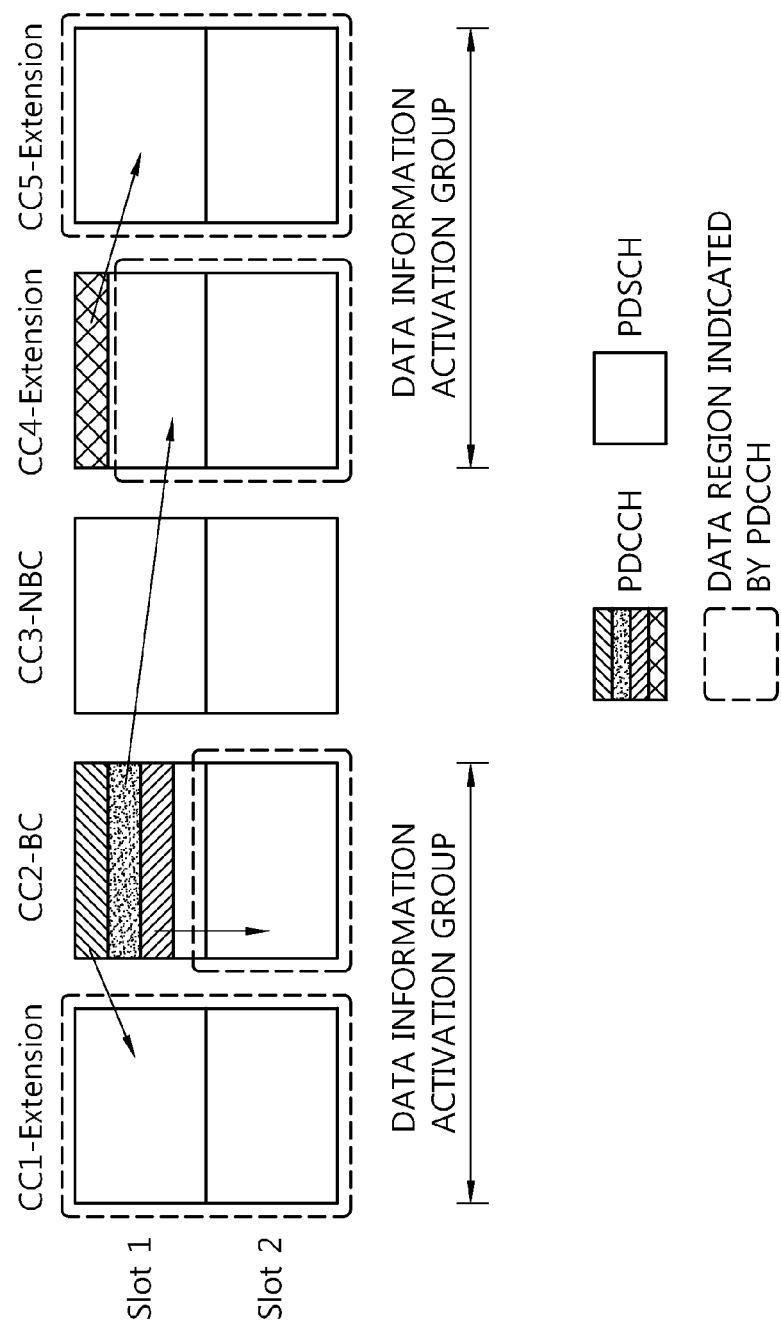
FIG. 5 shows a control information activation group and a data information activation group in downlink according to an exemplary embodiment of the present invention.

FIG. 5 shows a control information activation group and a data information activation group in downlink according to an exemplary embodiment of the present invention. Referring to FIG. 5, the eNB 20 may configure the same CC as a CC having a DCI format for the UE 10 among all receivable CCs (i.e., a CC1 to a CC5) or CCs (i.e., the CC2 and the CC4) including control information (i.e., PDCCH) of at least one of other CCs as the control information activation group.

Further, the eNB 20 may configure CCs including data information (i.e., PDSCH) indicated by the control information (i.e., PDCCH) of the control information activation group as the data information activation group (also referred to as a PDSCH active set). For example, as shown in FIG. 5, CCs (i.e., the CC1, the CC2, the CC4, and the CC5) including data information (i.e., PDSCH) indicated by control information of CCs (i.e., the CC2 and the CC4) corresponding to the control information activation group may be configured as the PDSCH active set. The PDSCH active set may also be referred to as a PDSCH monitoring set.

The eNB 20 transmits a control information activation indicator and a data information activation indicator to the UE 10. The UE 10 receives the control information activation indicator and data information activation indicator. The UE 10 may receive control information (i.e., PDCCH) existing in CCs (i.e., the CC2 and the CC4) belonging to the control information activation group by using the control information activation indicator, and thereafter confirm the data information (i.e., PDSCH) of CCs (i.e., the CC1, the CC2, the CC4, and the CC5) belonging to the data information activation group by using the data information activation indicator without having to confirm a location of the PDSCH transmitted to the UE 10 by analyzing information included in the control information (i.e., PDCCH).

In this case, the eNB 20 may transmit the control information activation indicator and the data information activation indicator to the UE 10, and by using the received information, the UE 10 may receive only CCs belonging to the control information activation group and the data information activation group. The UE 10 may perform blind decoding on control information existing in the CCs belonging to the control information activation group and confirm data information (i.e., PDSCH) of the CCs (i.e., the CC1, the CC2, the CC4, and the CC5) belonging to the data information activation group.

Consequently, the UE 10 receives only the CCs belonging to the control information activation group, e.g., the CC2 and the CC3. Therefore, a missing region in which data information cannot be received is not generated in the CCs belonging to the control information activation group, e.g., the CC1, the CC2, the CC4, and the CC5.

If the data information activation group is configured and used as described above, a small number of CC are received and monitored, and thus a power consumption amount may be decreased, and an error caused by a time difference generated when analyzing data information by using control information may be decreased.

Parameters to be considered to construct the specific activation groups can be classified into two types as follows.

First, the factors in determination of wireless communication capability when the eNB 20 intends to transmit data to the UE 10 in a wireless fashion are factors that commonly have an effect on information reliability for both control information and data information. The factors include a power characteristic classified into transmit power, interference power, and noise power; a radio frequency (RF) device characteristic represented by an antenna pattern, the number of antennas, an RF circuitry, or the like; a baseband transmission/reception method and algorithm, such as OFDM, CDMA, channel coding, MIMO processing, or the like; and a channel environment expressed by a surrounding environment, a user location, or the like.

Second, there are factors having different affects according to an information characteristic. For example, the control information and the data information may be transmitted using different transmission methods as they are received by the UE 10 for different purposes, and a quality of service (QoS) value, such as a required data rate per unit time, may be different between the control information and the data information. In other words, QoS and a method for transmitting the data information may change according to a required service of an application program of the UE 10, but the control information may not be significantly affected by such a change.

In another aspect, if a user desires to receive a consistent service but system reliability is low due to a resource usage rate of the system, a surrounding environment change, etc., transmission and assignment of the control information for compensating this may change, whereas there may be no effect when transmitting the data information.

In this case, the data information activation group may be a sub-group of the control information activation group, or the control information activation group may be a sub-group of the data information activation group, or the control information activation group and the data information activation group may have no inclusion relation.

In order to decrease a power consumption amount of the UE 10, the control information activation group may be the sub-group of the data information activation group. If only the data information activation group is constructed without having to configure the control information activation group, only CCs belonging to the data information activation group are considered when the control information is assigned. That is, if the control information activation group is not constructed, the control information may be transmitted by using a CC in the constructed data information activation group.

In addition, if the inclusion relation is not satisfied between the control information activation group and the data information activation group, an activated activation group of the UE 10 can be defined as a union set of the two groups.

Figure 6:
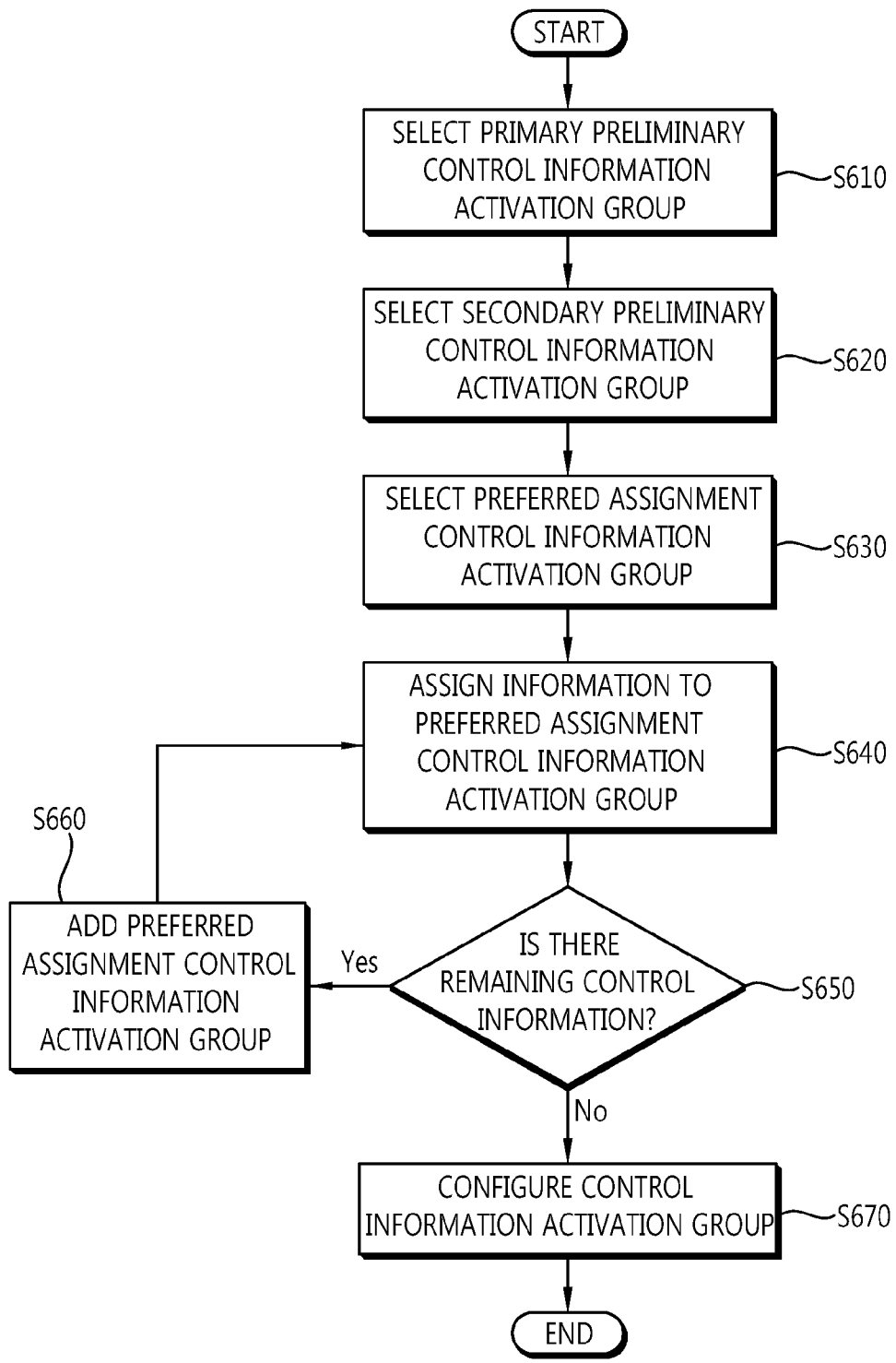
FIG. 6 is a flowchart for configuring a control information activation group according to an exemplary embodiment of the present invention.
Figure 7:
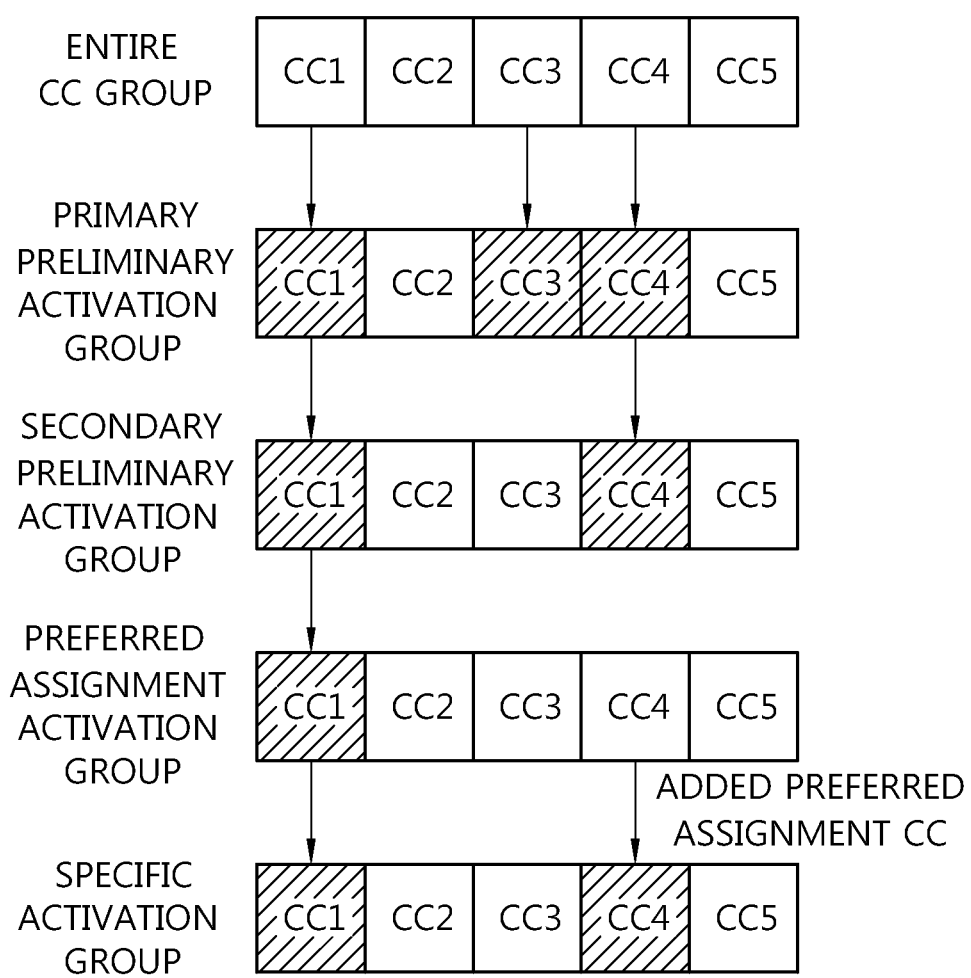
FIG. 7 shows a structure of an activation group for each layer according to an exemplary embodiment of the present invention.

FIG. 6 is a flowchart for configuring a control information activation group according to an exemplary embodiment of the present invention. FIG. 7 shows a structure of an activation group for each layer according to an exemplary embodiment of the present invention.

Referring to FIG. 6 and FIG. 7, only CCs capable of transmitting control information are first selected from all CCs to configure the selected CCs as a primary preliminary activation group (operation S610). As shown in FIG. 7, only CCs (i.e., a CC1, a CC3, and a CC4) capable of transmitting the control information are selected from all CCs (i.e., a CC1 to a CC5) to configure the selected CCs as the primary preliminary control information activation group (operation S610).

Next, among the CCs belonging to the configured primary preliminary activation group, CCs that can be transmitted or received by the UE 10 are configured as a secondary preliminary control information activation group by considering a device configuration condition of the UE 10 such as (1) an operational frequency range of an RF device and/or (2) the number of antennas (operation S620). As shown in FIG. 7, among the primary preliminary control information activation group (i.e., the CC1, the CC3, and the CC4), CCs (i.e., the CC1 and the CC4) that can be transmitted/received by the UE 10 are configured as the secondary preliminary control information activation group by considering, for example, the device configuration condition of the UE 10.

Next, among characteristics of CCs of the secondary preliminary activation group, one or more preferred assignment activation groups can be finally configured by considering several factors, i.e., (1) a control information resource usage rate, (2) transmit power, (3) receive power in the UE, (4) interference power or noise power or a sum of the two power levels, (5) a ratio of receive power to interference power in the UE or a ratio of receive power to interference power and noise power, and/or (6) a format of transmissible control information (operation S630). A group of the configured preferred assignment CCs is referred to as an activation group for the control information. As shown in FIG. 7, among the secondary preliminary control information activation group (i.e., the CC1 and the CC4), the preferred assignment CC (i.e., the CC1) is configured as the preferred assignment control information activation group by considering a CC characteristic of the secondary preliminary control information activation group (i.e., the CC1 and the CC4).

Next, the control information is assigned to the configured preferred assignment CC (i.e., the CC1) (operation S640).

Next, it is determined whether there is remaining control information to be assigned to the preferred assignment CC (operation S650). In this case, if there is the remaining control information to be assigned to the preferred assignment CC, a process of adding the preferred assignment CC (i.e., the CC4) in the same manner as operation S630 except for the previously configured preferred assignment CC (i.e., the CC1) (operation S660) and a process of assigning the control information to preferred assignment CC added (operation S640) may be repeated until the control information to be transmitted is entirely transmitted.

In this case, a maximum amount of information that can be assigned to the preferred assignment CC is derived from a cost function defined by considering factors considered if the secondary preliminary control information activation group is configured and factors used when the preferred assignment CC is configured. The cost function may have an option such as (1) minimization of the number of CCs (i.e., decrease of power consumption) and/or (2) maximization of the number of CCs (i.e., maximization of a diversity gain, ensuring of system reliability, etc).

Next, if there is no remaining control information to be assigned to the preferred assignment CC, the preferred assignment CCs (i.e., the CC1 and the CC4) to which the control information is assigned are configured as the control information activation group (operation S670).

Figure 8:
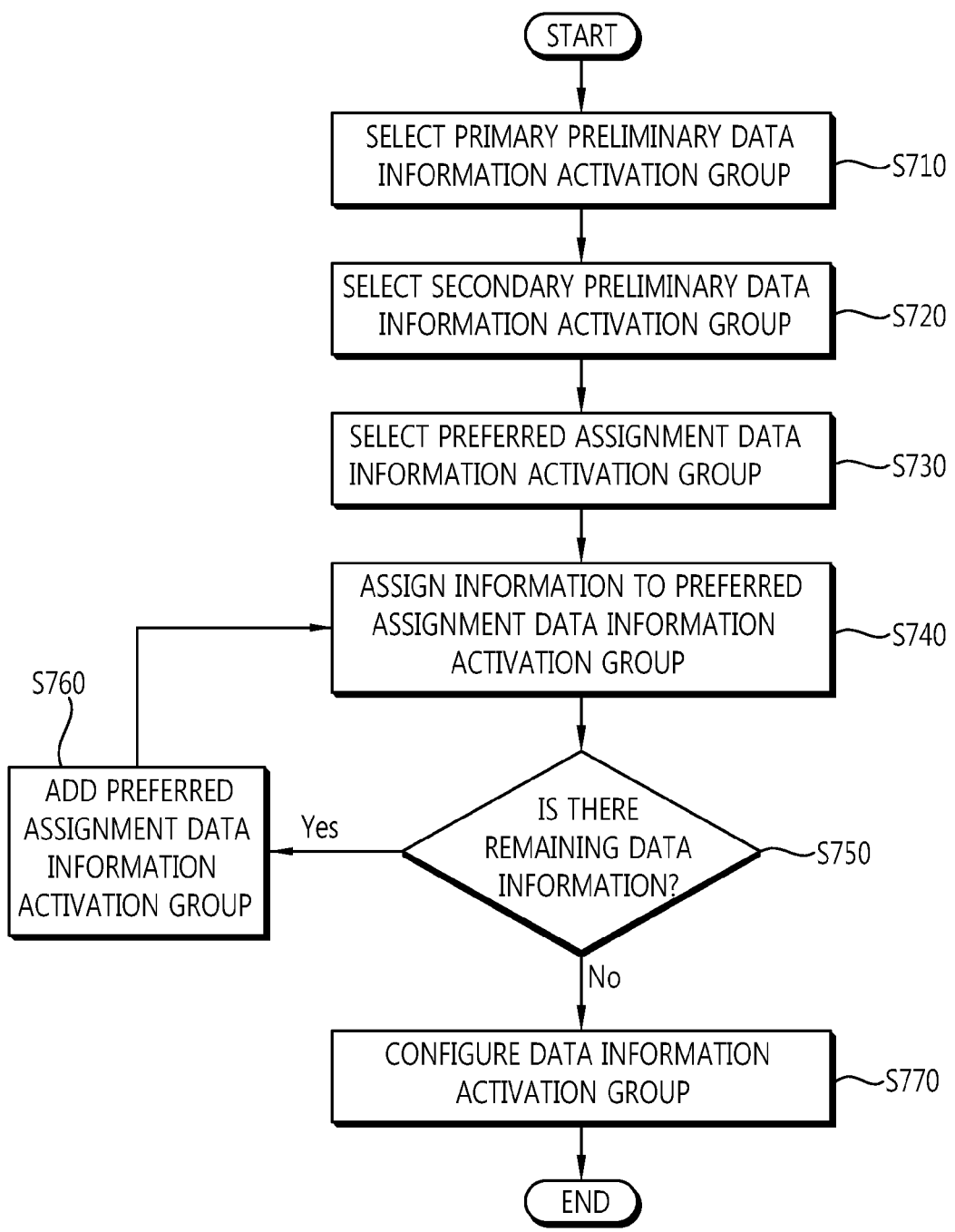
FIG. 8 is a flowchart for configuring a data information activation group according to an exemplary embodiment of the present invention.

FIG. 8 is a flowchart for configuring a data information activation group according to an exemplary embodiment of the present invention. Referring to FIG. 8, among all CCs, only CCs capable of transmitting data information are configured as a primary preliminary data information activation group (operation S710).

Next, among the CCs configured in the primary preliminary data information activation group, CCs that can be transmitted or received by the UE 10 are configured as a secondary preliminary data information activation group by considering a device configuration condition of the UE 10, such as (1) an operational frequency range of an RF device, (2) the number of antennas, (3) memory capacity in the device, and/or (4) a maximum operational clock count (operation S720).

Next, among characteristics of CCs configured in the secondary preliminary data information activation group, one or more preferred assignment CCs can be configured by considering several factors, i.e., (1) a control information resource usage rate, (2) transmit power, (3) receive power in the UE, (4) interference power or noise power or a sum of the two power levels, (5) a ratio of receive power to interference power in the UE or a ratio of receive power to interference power and noise power, (6) a bandwidth, and/or (7) a presence/absence of control information transmission (operation S730).

Next, the data information is assigned to the configured preferred assignment CC (operation S740).

Next, it is determined whether there is remaining data information to be assigned to the preferred assignment CC (operation S750). In this case, if there is the remaining data information to be assigned to the preferred assignment CC, a process of adding the preferred assignment CC in the same manner as operation S730 except for the previously determined preferred assignment CC (operation S760) and a process of assigning the data information to the preferred assignment CC added (operation S740) may be repeated until the data information to be transmitted is entirely transmitted.

In this case, a maximum amount of information that can be assigned to the preferred assignment CC is derived from a cost function defined by considering factors considered when the secondary preliminary data information activation group is configured and factors used when the preferred assignment CC is configured. The cost function may have an option such as (1) minimization of the number of CCs (i.e., decrease of power consumption) and/or (2) maximization of the number of CCs (i.e., maximization of a diversity gain, ensuring of system reliability, etc).

Next, if there is no remaining data information to be assigned to the preferred assignment CC, the preferred assignment CCs to which the data information is assigned are configured as the data information activation group (operation S770).

Meanwhile, the eNB 20 of FIG. 6, FIG. 7, and FIG. 8 or a scheduler of the eNB 20 may configure a specific activation group, for example, the control information activation group and the data information activation group, in a case in which a specific time elapses periodically, a case in which a specific external condition for starting to construct the specific activation group is satisfied or an event occurs, and a case in which a specific internal condition for starting to construct the specific activation group is satisfied or an event occurs.

In this case, the case in which the specific external condition for starting to construct the specific activation group or the event occurs may be a case in which a power characteristic of the UE decreases to below a reference threshold or a channel condition deteriorates to below a threshold or a required service of an application program of the UE 10 changes.

The case in which the specific internal condition for starting to construct the specific activation group or the event occurs may be a case in which system reliability decreases due to a resource usage rate in the system, a surrounding environment change, etc.

Figure 9:
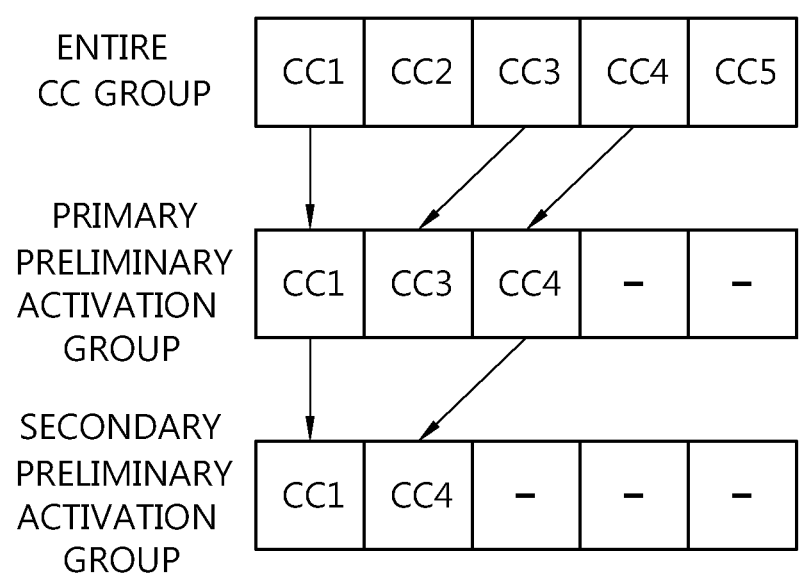
FIG. 9 shows an example of transmitting an activation indicator individually for each CC of an activation group according to an exemplary embodiment of the present invention.

FIG. 9 shows an example of transmitting an activation indicator individually for each CC of an activation group according to an exemplary embodiment of the present invention.

Referring to FIG. 9, the eNB 20 may transmit the activation indicator to the UE 10. The activation indicator is information that individually indicates activation and deactivation of respective CCs belonging to the activation group.

As shown in FIG. 9, among all CCs (i.e., a CC1 to a CC5), only CCs (i.e., the CC1, the CC3, and the CC4) capable of transmitting control information are selected to be configured as a primary preliminary activation group. In this case, the eNB 20 deactivates CCs (i.e., the CC2 and the CC5) which are not configured as the primary preliminary activation group. That is, the eNB 20 transmits to the UE 10 an activation indicator by setting a bit of the activation indicator to "1" if the bit corresponds to a CC index of a CC that belongs to the primary preliminary activation group and thus is activated and by setting the bit to "0" if the bit corresponds to a CC index of a CC that does not belong to the primary preliminary activation group and thus is deactivated.

The activation indicator may be generated on the basis of the primary preliminary activation group, or may be generated on the basis of a secondary preliminary activation group. For example, if activated/deactivated CCs are expressed by 5 bits according to whether they belong to the primary preliminary activation group of FIG. 9, the activation indication is set to "10110". In addition, if activated/deactivated CCs are expressed by 5 bits according to whether they belong to the secondary preliminary activation group of FIG. 9, the activation indication is set to "10010".

Herein, the wireless communication system is a system that may simultaneously use up to 5 CCs. In addition, if the wireless communication system is a system supporting M CCs (where M≥5), the activation indicator corresponding to the CC may be configured with m bits. For example, if the UE supports one PSC and 7 SSC, that is, in order to indicate activation/deactivation of 8 CCs, the activation indicator may be configured to have a length of 8 bits. In this case, according to a characteristic of the PSC, an activation indicator for the PSC may not be configured.

Figure 10:
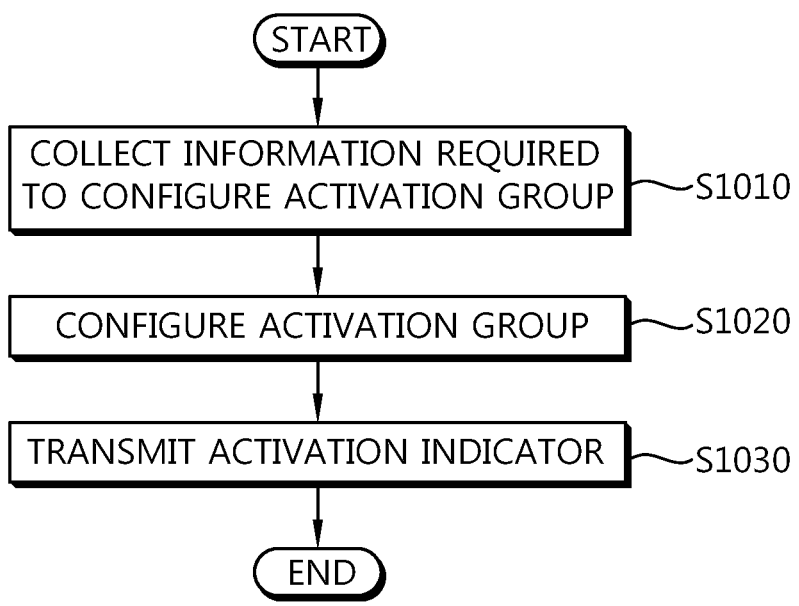
FIG. 10 is a flowchart for transmitting an activation indicator in an eNB according to an exemplary embodiment of the present invention.

FIG. 10 is a flowchart for transmitting an activation indicator in an eNB according to an exemplary embodiment of the present invention.

Referring to FIG. 10, in a wireless communication environment, the UE 10 may establish synchronization with the eNB 20 and receive a master information block (MIB) through a physical broadcast channel (PBCH) in a specific frequency band, or receive a system information block (SIB) through a PDSCH. Through this process, the UE 10 exchanges basic control information for communication with the eNB 20 and thus can be camped on to enter a state in which communication with the eNB 20 is possible.

The eNB 20 or the scheduler of the eNB 20 collects information that can be confirmed and used to construct or configure a control information activation group or a data information activation group through the camp-on process (operation S1010). Examples of the information include a device characteristic of the UE 10, e.g., a power characteristic, an RF device characteristic, a baseband transmission/reception scheme, an algorithm in use, an available CC, a supportable service, the number of antennas, etc.

Next, the eNB 20 or the scheduler of the eNB 20 configures an activation group according to the activation group construction or configuration method described above with reference to FIG. 6, FIG. 7, and FIG. 8 by using the information collected in the camp-on process and information previously known to the eNB 20 (operation S1020).

Next, the eNB 20 or the scheduler of the eNB 20 transmits the activation indicator configured in operation S1020 to the UE 10 (operation S1030). The eNB 20 may transmit to the UE 10 the activation indicator in which activated/deactivated CCs are expressed by 5 bits according to whether the CCs belong to the activation group as described above with reference to FIG. 9.

In addition, if 8 serving cells are supported, the activation indicator configured to have the length of 8 bits may be transmitted to the UE 10. Herein, since the PSC is always in the activation state, a 7-bit activation indicator may be transmitted for the SSC which is not configured with the activation indicator for the PSC.

The activation indicator may be transmitted to the UE 10 through the PDCCH or the PDSCH.

Further, the eNB 20 may transmit the activation indicator by using radio resource control (RRC) signaling. Furthermore, after constructing the activation indicator, the eNB 20 may transmit the activation indicator by using a higher layer (L2 or higher) signaling, or by using an L1 signaling, or by combining the L1 signaling and the higher layer (L2 or higher) signaling. In this case, the constructed activation indicator can be partially or entirely transmitted by selectively applying one of the signaling mechanisms according to a condition.

The higher layer (L2 or higher) is a higher layer of a physical layer (i.e., an L1 layer), for example, an L2 layer including a medium access control (MAC) layer or a radio link control (RLC) layer, a packet data convergence protocol (PDCP) layer, and a broadcast/multicast control (BMC) layer, and an L3 layer including a radio resource control (RRC) layer, etc.

Figure 11:
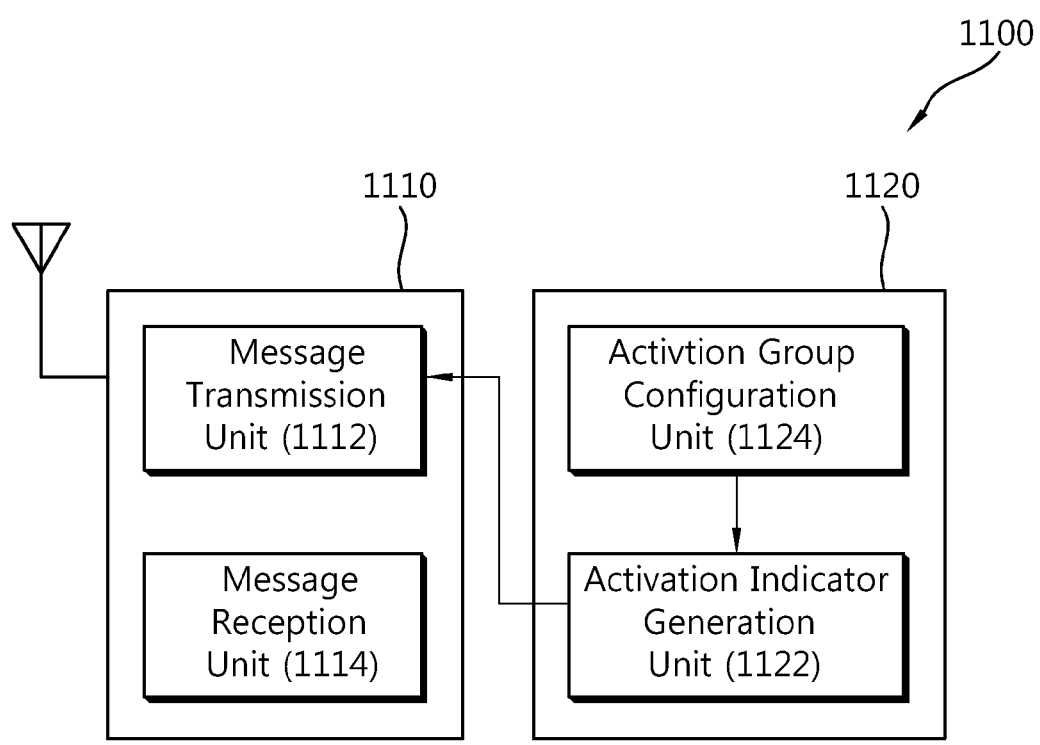
FIG. 11 is a schematic view of a transmitter for transmitting an activation indicator according to an exemplary embodiment of the present invention.

FIG. 11 is a schematic view of a transmitter to transmit an activation indicator according to an exemplary embodiment of the present invention. Referring to FIG. 11, a transmitter 1100 of the activation indicator includes a transceiver 1110 and a control unit 1120. The control unit 1120 includes an activation group configuration unit 1124, and an activation indicator generation unit 1122. And the transceiver 1110 includes a message transmission unit 1112, and a message reception unit 1114.

As described in FIG. 6 to FIG. 10, the activation group configuration unit 1124 confirms CCs that can be activated by using information collected in a camp-on process and information previously known to the eNB 20. Further, the activation group configuration unit 1124 configures an activation group from CCs that satisfy a condition among the confirmed CCs.

The activation indicator generation unit 1122 generates the activation indicator on the basis of the configured activation group as configured by the activation group configuration unit 1124, and delivers the generated activation indicator to the message transmission unit 1112.

The message transmission unit 1112 receives the activation indicator from the activation indicator generation unit 1122, and transmits the activation indicator to the UE 10. In this case, as described above, the transceiver 1110 may transmit information on the configured CC group through a PDCCH or a PDSCH, or may transmit the information by using higher layer (L2 or higher) signaling or by using L1 signaling or by combining the L1 signaling and the higher layer (L2 or higher) signaling.

If the message transmission unit 1112 transmits the activation indicator by using the L2 signaling, the activation indicator is a MAC protocol data unit (PDU), and is generated by the activation indicator generation unit 1122. A method for generating the activation indicator in a MAC PDU format by the activation indicator generation unit 1122 will be described below in detail with reference to FIG. 16.

The message reception unit 1114 receives information required to configure a control information activation group or a data information activation group from the UE 10 by performing the camp-on process with respect to the UE 10. The information is a device characteristic of the UE 10 and, for example, includes an RF device characteristic, a baseband transmission/reception scheme, an algorithm in use, an available CC, a supportable service, the number of antennas, etc. The message reception unit 1114 delivers the received information to the activation group configuration unit 1122.

Figure 12:
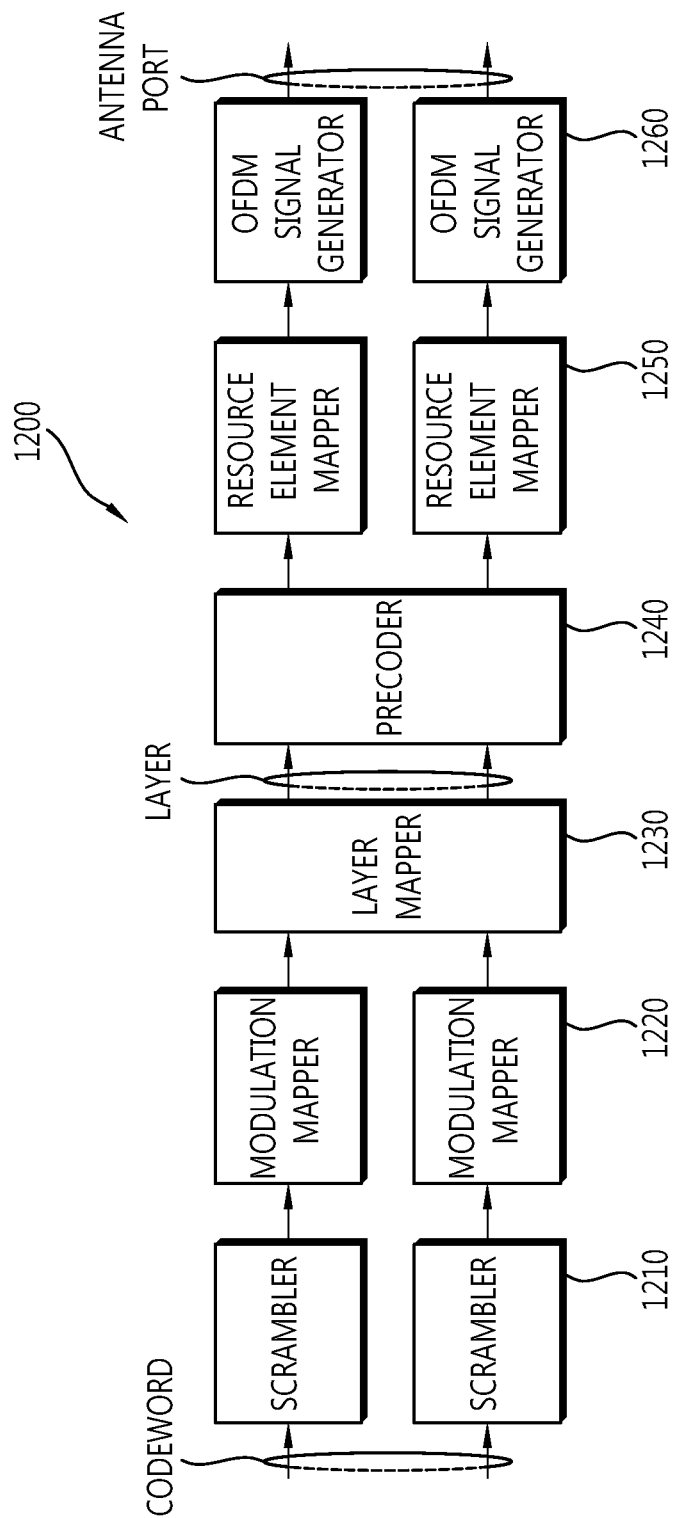
FIG. 12 shows a signal generation structure of a downlink physical channel for transmitting an activation indicator according to an exemplary embodiment of the present invention.

Hereinafter, an example of using OFDM and MIMO in the wireless communication system according to an exemplary embodiment of the present invention will be describe with reference to FIG. 12. FIG. 12 shows a signal generation structure of a downlink physical channel for transmitting an activation indicator according to an exemplary embodiment of the present invention.

Referring to FIG. 12, a signal generation structure 1200 of a downlink physical channel includes a scrambler 1210, a modulation mapper 1220, a layer mapper 1230, a precoder 1240, a resource element mapper 1250, and an OFDM signal generator 1260.

The activation indicator is input in a codeword format via channel coding in downlink. In this case, bits which are input in the codeword format via the channel coding in downlink are scrambled by the scrambler 1210 and are then input to the modulation mapper 1220.

The modulation mapper 1220 modulates the scrambled bits into a complex-valued modulation symbol. The layer mapper 1230 maps the complex-valued symbol to one or a plurality of transmission layers. Thereafter, on respective transport channels of an antenna port, the precoder 1240 performs precoding on the complex-valued modulation symbol. Thereafter, the resource element mapper 1250 maps the complex-valued modulation symbol for each of antennas, for example, #1 to #8, to corresponding resource elements. In this case, in the signal generation structure 1200 of the message transmission unit 1115, resources of an OFDM symbol (x-axis) and a subcarrier location (y-axis) are assigned by a predefined rule as described above, and are multiplexed with an eNB transmission frame at predefined frame timing.

Thereafter, the OFDM signal generator 1260 generates an OFDM symbol for each antenna in a complex time domain. The OFDM symbol in the complex time domain is transmitted through the antenna port.

Figure 13:
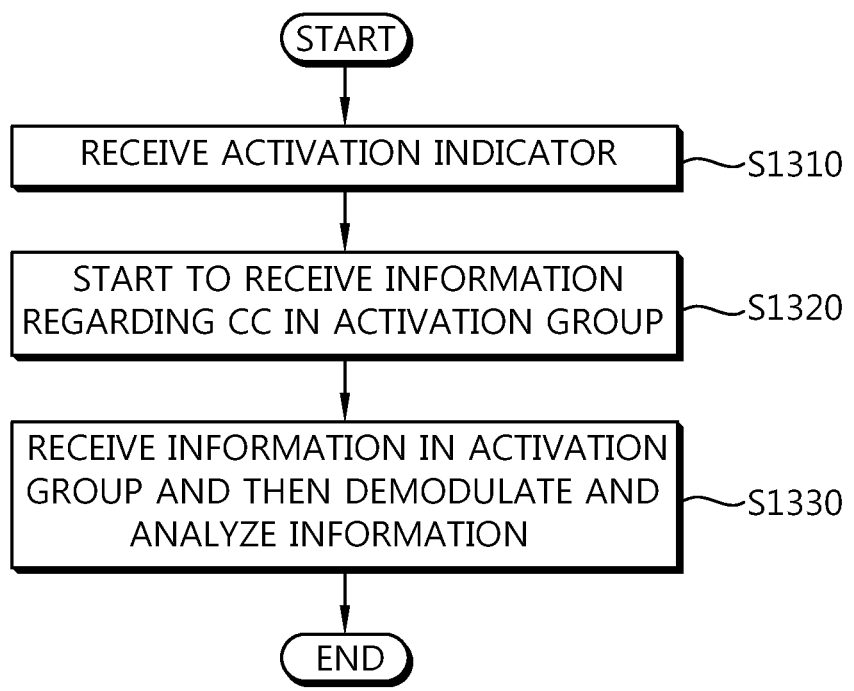
FIG. 13 is a flowchart for receiving an activation indicator according to an exemplary embodiment of the present invention.

FIG. 13 is a flowchart for receiving an activation indicator according to an exemplary embodiment of the present invention. Referring to FIG. 13, in operation S1310, the UE 10 receives the activation indicator. In operation S1320, the UE 10 activates at least one deactivated CC on the basis of the received activation indicator, or deactivates at least one activated CC. In this case, the activation indicator can be expressed by 5 bits.

Meanwhile, if the UE supports 8 serving cells, an 8-bit activation indicator may be received. Herein, the UE may receive the 7-bit activation indication for the SSC which is not configured with the activation indicator for the PSC.

In operation S1330, the UE receives a PDCCH or PDSCH transmitted from the eNB 20 by using the at least one activated CC, and then demodulates and analyzes the received PDCCH or PDSCH. In other words, the UE cannot receive a PDCCH or a PDSCH by using at least one deactivated CC. In addition, since uplink scheduling grants are impossible when using the deactivated CC, the UE cannot perform uplink data transmission by using the deactivated CC.

Operation S1330 will be described in detail. It is assumed herein that the UE supports 8 serving cells for example. In this case, if the activation group is based on reception of the PDCCH between the eNB and the UE, the UE receives the PDCCH by using a corresponding SSC indicated as the activation state by confirming the 8-bit activation indicator, and then demodulates and analyzes the received control information.

In addition, if the activation group is based on reception of the PDSCH between the eNB and the UE, the UE receives the PDSCH by using the corresponding SSC indicated as the activation state by confirming the 8-bit activation indicator, and then demodulates and analyzes the received data information.

In addition, if the activation group is based on reception of at least one of the PDCCH and the PDSCH between the eNB and the UE, the UE receives the PDCCH or the PDSCH by using the corresponding SSC indicated as the activation state by confirming the 8-bit activation indicator. Then, the UE demodulates and analyzes the received control information or data information.

Meanwhile, as to the PDCCH, the UE may selectively receive and demodulate the PDCCH by using a specific serving cell among the deactivated serving cells. Herein, demodulation is a process of confirming whether the received PDCCH is a PDCCH for the UE, and includes cyclic redundancy check (CRC). In this case, the UE does not analyze the control information included in the PDCCH received by using the serving cell in the deactivation state.

Meanwhile, the UE may receive the activation indicator by performing RRC signaling. Alternatively, the UE may receive the activation indicator by using higher layer (L2 or higher) signaling or by using L1 signaling or by combining the L signaling and the higher layer (L2 or higher) signaling.

By using a confirmed CC, the UE 10 confirms a region in which data information is received and a region in which control information is received. In this case, the region in which the control information is received can be used to confirm the region in which the data information is received.

Figure 14:
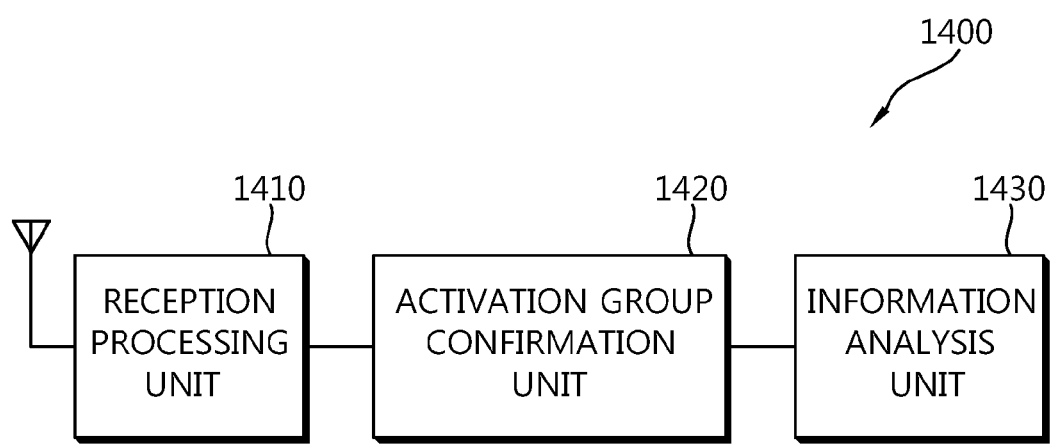
FIG. 14 shows a receiver for receiving an activation indicator according to an exemplary embodiment of the present invention.

FIG. 14 shows a receiver to receive an activation indicator according to an exemplary embodiment of the present invention. Referring to FIG. 14, a receiver 1400 of the UE in the wireless communication system includes a reception processing unit 1410, an activation group confirmation unit 1420, and an information analysis unit 1430.

A signal received through each antenna port is converted into a signal of a complex time domain by the reception processing unit 1410.

The activation group confirmation unit 1420 extracts a serving cell index of a serving cell to be configured in the UE from the converted signal by using RRC signaling of the eNB. Further, the activation group confirmation unit 1420 extracts index mapping information and the activation indicator, which indicates activation/deactivation of a CC based on a specific serving cell index, from a MAC message of the eNB.

The activation indicator may be constructed in a format of a bitmap having a specific length. The length of the bitmap may be determined variously, for example, 4 bits, 8 bits, etc. Each bit of the bitmap corresponds to or is mapped to a unique serving cell index according to its position. A position of a specific bit of the bitmap may be fixedly determined by an index of a supportable component carrier. The serving cell may be a primary serving cell (PSC) or a secondary serving cell (SSC). Further, the PSC may be fixedly determined.

For example, if the bitmap length is 8 bits, the serving cell index of the serving cell to be configured in the UE is mapped to a bit in a unique position on the bitmap of the activation indicator. In this case, a specific position to which the serving cell index uniquely corresponds must be previously known between the UE and the eNB without additional signaling.

For another example, when the bitmap length is 4 bits, the serving cell index of the serving cell to be configured in the UE is mapped to the bitmap after being ordered according to its sequence. For example, a bit with a lowest priority indicates activation/deactivation of a CC based on a smallest serving cell index among serving cells configured in the UE. Further, a bit with a next priority indicates activation/deactivation of a CC based on a second smallest serving cell index among the serving cells configured in the UE. In this case, a specific order according to which the serving cell index of the serving cells to be configured in the UE is ordered and mapped to the bitmap must be previously known between the UE and the eNB without additional signaling.

For another example, if the bitmap length is 4 bits, a specific bit position on the bitmap and corresponding to the serving cell index of the serving cell to be configured in the UE may be signaled from the eNB to the UE.

Detailed descriptions on the activation indicator and the index mapping information will be described below.

The activation group confirmation unit 1420 confirms CCs which are grouped in correspondence with specific information. The activation group may differ depending on the specific information.

The information analysis unit 1430 confirms and analyzes information on each CC in the confirmed activation group and thus obtains control information or data information. The information analysis unit 1430 may receive control information (i.e., PDCCH) existing in a corresponding control information activation group and thereafter may confirm data information (i.e., PDSCH) indicated by the control information (i.e., PDCCH).

Further, the information analysis unit 1430 may receive only CCs belonging to the control information activation group and the data information activation group by using the information, so that control information existing in a CC belonging to the control information activation group is blind decoded and data information of a CC belonging to the data information activation group is confirmed.

Furthermore, the information analysis unit 1430 confirms activation/deactivation of each CC from the extracted activation indicator. Accordingly, the receiver 1400 monitors or blind-decodes or receives selectively only a control channel of an activated CC, and does not monitor or blind-decode or receive a deactivated CC. When a specific downlink CC is deactivated, the receiver 1400 no longer receives a PDCCH (downlink assignment and uplink grants) of a corresponding serving cell. In addition, when the specific downlink CC is deactivated under a cross carrier scheduling environment, the receiver 1400 no longer has to receive downlink assignments related to a UE-specific PDCCH search space.

The receiver 1400 of the UE of the wireless communication system is an apparatus for receiving a signal transmitted from the message transmission unit 1112 described above with reference to FIG. 11. Therefore, the receiver 1400 consists of elements for performing signal processing which is reverse to that of the transmitter 1100.

Therefore, it shall be construed that unspecified elements of the receiver 1400 can be replaced with respective elements for performing the signal process which is reverse to that of FIG. 11. In addition, unspecified operations of the transmitter 1100 can be performed by being constructed with elements for performing operations which are reverse to those of the receiver 1400 of FIG. 14.

Hereinafter, a definition and type of a serving cell and an activation indicator will be described in greater detail.

The serving cell is a cell in which the UE is currently receiving a service. A neighbor cell is a cell geographically neighboring to the serving cell or a cell neighboring on a frequency band. In order to perform transmission and reception of packet data by using a specific cell, the UE must first complete configuration of a specific cell or CC. Herein, the configuration is a state in which system information required for data transmission/reception is completely received for a cell or CC.

For example, the configuration may include an overall process of receiving common physical layer parameters required for the data transmission/reception, or MAC layer parameters, or parameters required for a specific operation in an RRC layer. Thus, when the cell or the CC is completely configured, the cell or the CC is in a state in which packet transmission/reception becomes possible immediately as soon as receiving signaling information indicating that packet data can be transmitted.

Meanwhile, the cell in the completely configured state may exist in an activation or deactivation state. The reason of dividing the configuration state into the activation state and the deactivation state is to decrease battery consumption of the UE by allowing the UE to monitor or receive a control channel (i.e., PDCCH) and a data channel (i.e., PDSCH) only when in the activation state. Herein, an initial state related to activation immediately after the configuration is complete is the deactivation state.

The activation is a state in which traffic data is transmitted or received or in a ready state. The UE may monitor, blind-decode, or receive the control channel (i.e., PDCCH) and the data channel (i.e., PDSCH) of an activated cell in order to confirm a resource (e.g., frequency, time, etc.) assigned to the UE.

The deactivation is a state in which traffic data transmission or reception is impossible, and measurement or minimum information transmission/reception is possible. The UE may receive system information (SI) required to receive a packet from a deactivation cell. On the other hand, the UE does not monitor, blind-decode, or receive the control channel (i.e., PDCCH) and the data channel (i.e., PDSCH) of the deactivation cell to confirm the resource (e.g., frequency, time, etc.) assigned to the UE.

Figure 15:
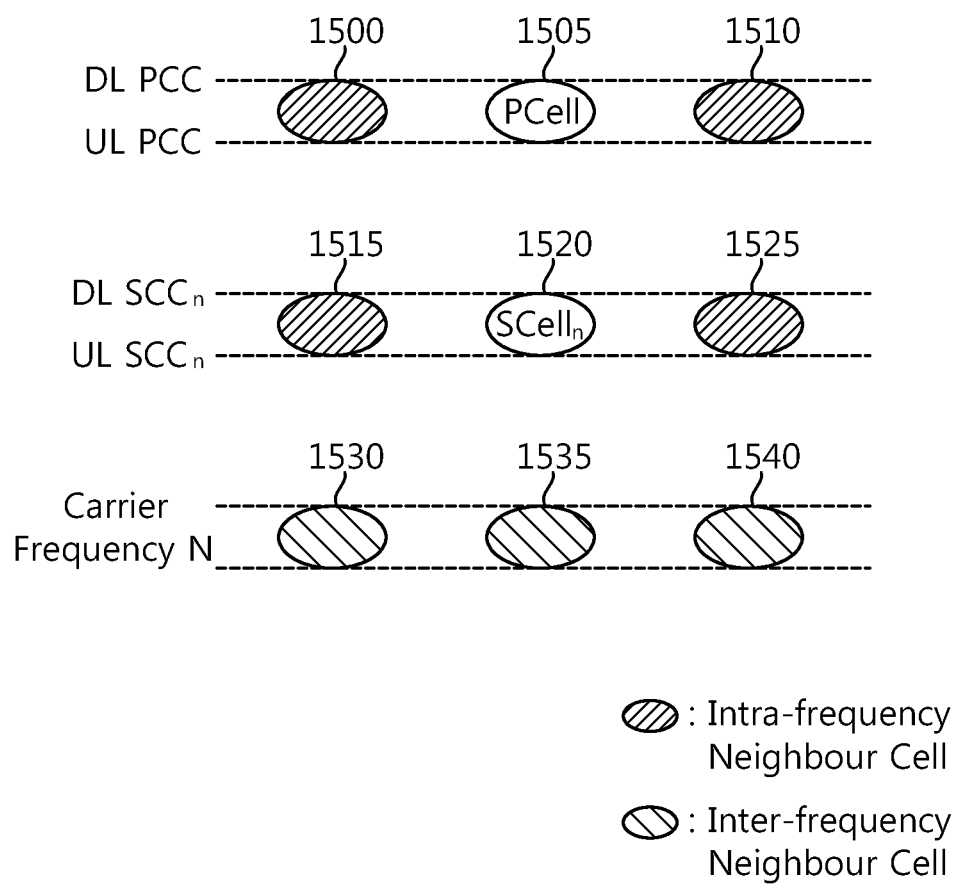
FIG. 15 is a diagram for explaining the concept of a primary serving cell (PSC) and a secondary serving cell (SSC).

FIG. 15 is a diagram for explaining the concept of a primary serving cell (PSC) and a secondary serving cell (SSC). Referring to FIG. 15, a PSC 1505 is one serving cell for providing security inputs and NAS mobility information in an RRC establishment or re-establishment state. According to UE capabilities, at least one cell can be constructed to be a group of serving cells together with the PSC 1505. The at least one cell is referred to as an SSC 1520.

Therefore, the group of the serving cells configured for one UE may be constructed only with one PSC 1505, or may be constructed with one PSC 1505 and at least one SSC 1520.

Intra-frequency neighbor cells 1500 and 1510 of the PSC 1505 and/or intra-frequency neighbor cells 1515 and 1525 of the SSC 1520 belong to the same carrier frequency. Inter-frequency neighbor cells 1530, 1535, and 1540 of the PSC 1505 and the SSC 1520 belong to different carrier frequencies.

A downlink CC corresponding to the PSC 1505 is referred to as a downlink primary component carrier (DL PCC). An uplink CC corresponding to the PSC 1505 is referred to as an uplink primary component carrier (UL PCC). A downlink CC corresponding to the SSC 1520 is referred to as a downlink secondary component carrier (DL SCC). An uplink CC corresponding to the SSC 1520 is referred to as an uplink secondary component carrier (UL SCC). One serving cell may correspond to only one DL CC, or may correspond to both the DL CC and the UL CC.

A PCC is a CC in which the UE initially establishes a connection (or RRC connection) among several CCs. The PCC serves as a connection (or RRC connection) for signaling with respect to a plurality of CCs, and is a special CC for managing UE context which is connection information related to the UE. Further, when the PCC establishes the connection with the UE and thus is in an RRC connected mode, the PCC always exists in an activation state.

The SCC is a CC assigned to the UE other than the PCC. The SCC is an extended carrier for additional resource assignment, etc., in addition to the PCC, and can be divided into an activation state and a deactivation state. The SCC is initially in the deactivation state.

The PSC 1505 and the SSC 1520 have the following characteristics.

First, the PSC 1505 is used for Physical Uplink Control Channel (PUCCH) transmission.

Second, the PSC 1505 is activated always, whereas the SSC 1520 is activated/deactivated according to a specific condition.

Third, if the PSC 1505 experiences a radio link failure (RLF), an RRC reconnection is triggered, whereas if the SSC 1520 experiences the RLF, the RRC reconnection is not triggered.

Fourth, the PSC 1505 may change by a security key change or a handover process accompanied by a random access channel (RACH) process.

As such, reconfiguration, adding, and removal processes of the SSC 1520 can be performed by the RRC layer. When the SSC 1520 is newly added, RRC signaling can be used to transmit system information of a dedicated SSC.

Hereinafter, an activation group is defined as a group including at least one of a control information activation group and a data information activation group. Further, an activation indicator is defined as information for indicating an activated CC and/or a deactivated CC on the basis of the activation group. In another aspect, the activation indicator is defined as information for indicating a CC to be monitored by the UE and a CC not necessarily monitored by the UE. The activation indicator indicates activation and deactivation individually for each CC belonging to the activation group. As described above, a DL CC may construct one serving cell, and the DL CC and a UL CC may construct one serving cell by being linked with each other.

Therefore, activation/deactivation of the CC is identical to the concept of activation/deactivation of the serving cell. For example, if it is assumed that a serving cell 1 is constructed with a DL CC1, activation of the serving cell 1 implies activation of the DL CC1. If it is assumed that a serving cell 2 consists of a DL CC2 and a UL CC2 with established connections, activation of the serving cell 2 implies activation of the DL CC2 and the UL CC2. Further, a PSC corresponds to a PCC, and an SSC corresponds to an SCC.

Figure 16:
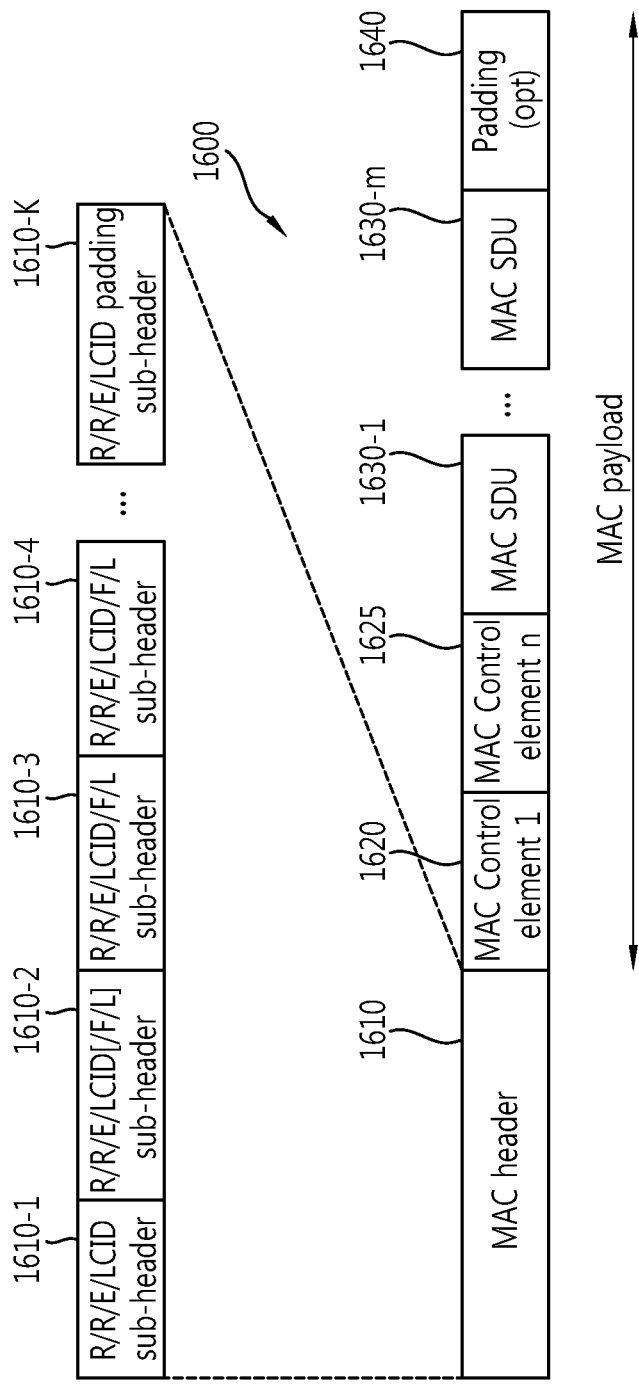
FIG. 16 shows a MAC protocol data unit (PDU) including an activation indicator according to an exemplary embodiment of the present invention.

FIG. 16 shows a MAC protocol data unit (PDU) including an activation indicator according to an exemplary embodiment of the present invention. The activation indicator included in the MAC PDU is applied to both Case 1 and Case 2. The MAC PDU can also be referred to as a transport block (TB).

Referring to FIG. 16, a MAC PDU 1600 includes a MAC header 1610, one or more MAC control elements 1620, ..., 1625, one or more MAC service data units (SDUs) 1630-1, ..., 1630-*m*, and a padding 1640.

The MAC control elements 1620 and 1625 are a control message generated by a MAC layer.

The MAC SDUs 1630-1, ..., 1630-*m* are the same as an RLC PDU delivered in a radio link control (RLC) layer. The padding 1640 is a specific number of bits appended to allow the MAC PDU to have a specific size. The MAC control elements 1620, ..., 1625, the MAC SDUs 1630-1, ..., 1630-*m*, and the padding 1640 are also collectively referred to as a MAC payload.

The MAC header 1610 includes one or more sub-headers 1610-1, 1610-2, ..., 1610-K, each of which corresponds to one MAC SDU or one MAC control element (MAC CE) or a padding. The MAC CE may include a least significant bit (LSB) by which the serving cells may be sorted. Further, the LSB may include an indicator of the PSC. An order of the sub-headers 1610-1, 1610-2, ..., 1610-K is identical to an order of corresponding MAC SDUs, MAC control elements, or paddings in the MAC PDU 1600.

Each of the sub-headers 1610-1, 1610-2, ..., 1610-K may include 4 fields, i.e., R, R, E, and LCID, or may include 6 fields, i.e., R, R, E, LCID, F, and L. A sub-header including the 4 fields is a sub-header corresponding to the MAC control element or the padding. A sub-header including the 6 fields is a sub-header corresponding to the MAC SDU.

The logical channel ID (LCID) field is an identification field for identifying a logical channel corresponding to the MAC SDU or for identifying a type of the MAC control element or the padding. The LCID field may have a length of 5 bits.

For example, the LCID field identifies whether a corresponding MAC control element is a surplus power MAC control element for transmitting surplus power, whether it is a feedback request MAC control element for requesting feedback information to the UE, whether it is a discontinuous reception (DRX) command MAC control element regarding a discontinuous reception command, and whether it is a contention resolution identity MAC control element for contention resolution between UEs.

In addition, according to an exemplary embodiment of the present invention, the LCID field can identify whether the corresponding MAC control element is a MAC control element including the activation indicator. One LCID field exists for each of the MAC SDU, the MAC control element, or the padding. Table 1 shows an example of the LCID field.

TABLE 1

| Index | LCID values |
| --- | --- |
| 00000 | CCCH |
| 00001-01010 | Identity of the logical channel |
| 01011-10111 | Reserved |
| 11000 | UL CC activation/deactivation |
| 11001 | DL CC activation/deactivation |
| 11010 | Power Headroom Report |
| 11011 | C-RNTI |
| 11100 | Truncated BSR |
| 11101 | Short BSR |
| 11110 | Long BSR |
| 11111 | Padding |

Referring to Table 1, an LCID field value of '11000' indicates that the corresponding MAC control element is a MAC control element including an activation indicator related to activation/deactivation of a UL CC. In addition, an LCID field value of '11001' indicates that the corresponding MAC control element is a MAC control element including an activation indicator related to activation/deactivation of a DL CC. Table 1 shows a case in which the UL CC and the DL CC are independently activated/deactivated.

However, activation/deactivation of the UL CC may be determined depending on activation/deactivation of the DL CC, which is shown in Table 2 below. Table 2 shows another example of the LCID field.

TABLE 2

| Index | LCID values |
| --- | --- |
| 00000 | CCCH |
| 00001-01010 | Identity of the logical channel |
| 01011-11000 | Reserved |
| 11001 | CC activation/deactivation |
| 11010 | Power Headroom Report |
| 11011 | C-RNTI |
| 11100 | Truncated BSR |
| 11101 | Short BSR |
| 11110 | Long BSR |
| 11111 | Padding |

Referring to Table 2, an LCID field value of '11001' indicates that the corresponding MAC control element is a MAC control element including the activation indicator, and this concurrently indicates activation/deactivation of the DL CC and the UL CC.

That is, activation/deactivation of a DL CC and a UL CC with connections established by the SIB2 is indicated, i.e., activation/deactivation of the serving cell is indicated. Herein, since the PSC is always in the activation state, activation/deactivation of the serving cell indicates activation/deactivation of the SSC.

The activation indicator is information transmitted from the eNB to the UE, and may be a message generated in a MAC layer or a message generated in an RRC layer. By referring the activation indicator, the UE can be aware of which CC will be activated among all CCs that can be provided by the eNB or among CCs configured in a UE-specific manner.

However, since the PCC is a CC used as a criterion in communication using multiple CCs, the PCC is activated, generally, for the purpose of synchronization maintenance, system information reception, etc. In this case, the eNB and the UE may implicitly agree that the PCC is activated always (hereinafter, Case 1). In addition, a case of explicitly indicating activation/deactivation of a CC even if the CC is the PCC may also be considered (hereinafter, Case 2). In Case 1, the activation indicator does not have to explicitly indicate activation of the PCC. Therefore, the UE operates by regarding that the PCC is activated, unless there is a special condition.

On the other hand, in Case 2, the activation indicator explicitly indicates activation of the PCC. Since different activation indicators are used in Case 1 and Case 2, each case will be separately described hereinafter.

1. Structure of activation indicator for Case 1

The activation indicator for Case 1 explicitly indicates activation/deactivation of an SSC. However, the activation indicator for Case 1 is constructed under the premise that a PSC is basically activated. Therefore, even if the activation indicator for Case 1 does not additionally indicate activation/deactivation of the PSC, the UE recognizes activation of the PSC.

Figure 17:
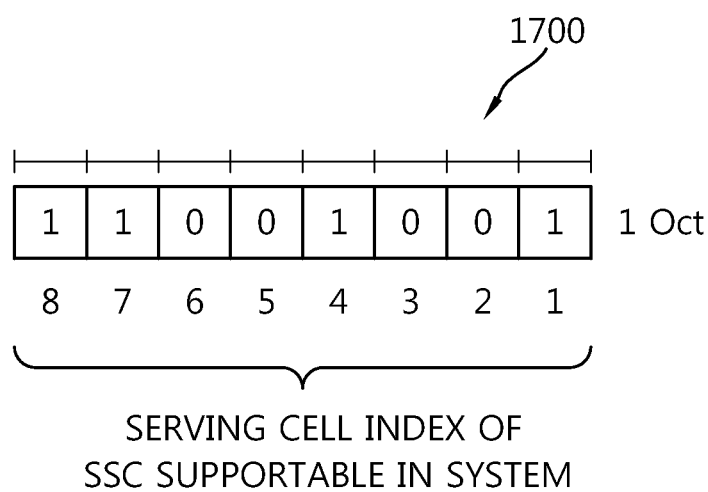
FIG. 17 shows a MAC control element including an activation indicator according to an exemplary embodiment of the present invention.

FIG. 17 shows a MAC control element including an activation indicator according to an exemplary embodiment of the present invention. Here, the number of SSCs supportable in the system is equal to the number of bits of the MAC control element including the activation indicator, and all supportable SSCs are configured in the UE.

Referring to FIG. 17, a MAC control element 1700 including the activation indicator has a length of 8 bits, and will be hereinafter referred to as an activation indication MAC control element. Bits at respective positions of the activation indication MAC control element 1700 correspond to indices of SSCs in a one-to-one manner. For example, a serving cell index 1 corresponds to an $8^{th}$ bit from the left, and a serving cell index 2 corresponds to a $7^{th}$ bit from the left. Herein, the serving cell index is a serving cell index for an SSC because a PSC is implicitly regarded as being activated between the UE and the eNB and thus the PSC is not additionally included in the activation indicator. An index of the PSC is always given a specific value, and it is assumed herein that the index is given 0. Therefore, the serving cells are indexed with 1, 2, 3, ..., 8, which are the remaining indices other than 0, i.e., the index of the PSC. Herein, the index of the serving cell may be a logical index determined relatively for each UE, or may be a physical index for indicating a cell of a specific frequency band.

Since the activation indication MAC control element 1700 has a length of 8 bits, the activation indicator can indicate indices of 8 SSCs in total. That is, the activation indicator can cover up to 8 CCs capable of indicating activation/deactivation.

Here, all supportable SSCs are configured in the UE. In this case, 8 SSCs are configured in the UE. The activation indication MAC control element 1700 is '11001001', and respective bits correspond to serving cell indices {8, 7, 6, 5, 4, 3, 2, 1} from the left. Therefore, the activation indicator indicates activation of CCs corresponding to the serving cell indices {1, 4, 7, 8} and indicates deactivation of CCs corresponding to the serving cell indices {2, 3, 5, 6}. Herein, since the serving cell index 0 indicates a PSC, even though it is not indicated by the activation indication MAC control element 1700, the PSC is implicitly regarded as being activated. An order of a serving cell index corresponding to a position of each bit of the activation indication MAC control element 1700 is for exemplary purposes only, and the serving cell index does not have to be arranged in the order of FIG. 17 and thus may be arranged in another order.

However, if there is no additional signaling, the UE and the eNB have to know an order according to which each serving cell index corresponds to each bit of the activation indication MAC control element 1700. The order is an order according to which a serving cell index of a serving cell configured in the UE is mapped to each bit of the activation indication MAC control element 1700. For example, a bit with a lowest priority indicates activation/deactivation of a CC based on a lowest serving cell index among serving cells configured in the UE. A bit with a next priority indicates activation/deactivation of a CC based on a second lowest serving cell index among the serving cells configured in the UE. The order is not additionally reported by the eNB to the UE, and is determined by the same rule.

Figure 18:
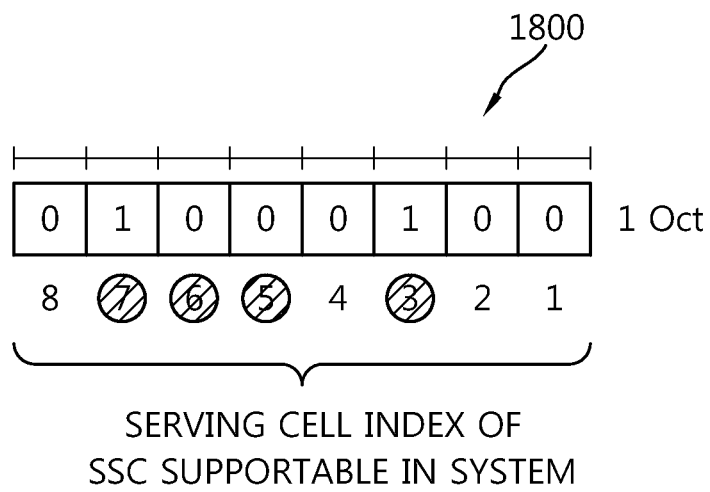
FIG. 18 shows a MAC control element including an activation indicator according to an exemplary embodiment of the present invention.

FIG. 18 shows a MAC control element including an activation indicator according to an exemplary embodiment of the present invention. Here, the number of SSCs supportable in the system is equal to the number of bits of the MAC control element including the activation indicator, and only some of the supportable SSCs are configured in the UE.

Referring to FIG. 18, bits of an activation indication MAC control element 1800 are sequentially mapped with all serving cell indices {1, 2, 3, 4, 5, 6, 7, 8}, respectively. Indices of serving cells configured in the UE are {3, 5, 6, 7}, and among them, indices of activated serving cells are {3, 7} and indices of deactivated serving cells are {5, 6}. Bits corresponding to the indices {1, 2, 4, 8} of the serving cells not configured in the UE are set to 0, and may always be set to 0. Bits corresponding to the activated serving cell indices {3, 7} are set to 1. Bits corresponding to the deactivated serving cell indices {5, 6} are set to 0. Therefore, the activation indication MAC control element 1800 is expressed by '01000100'.

As such, a bit corresponding to an index of a serving cell not configured in the UE is set to 0 as in a case in which the serving cell is deactivated. In this case, the UE ignores the bit corresponding to the index of the serving cell not configured in the UE.

FIG. 17 and FIG. 18 show cases in which the total number of SSCs supportable in the system is equal to the total number of bits of the activation indication MAC control element. However, if the total number of supportable SSCs is less than the total number of bits of the activation indication MAC control element, there is a need to determine how to utilize the remaining bits of the activation indication MAC control element. This will be described below with reference to FIG. 19.

Figure 19:
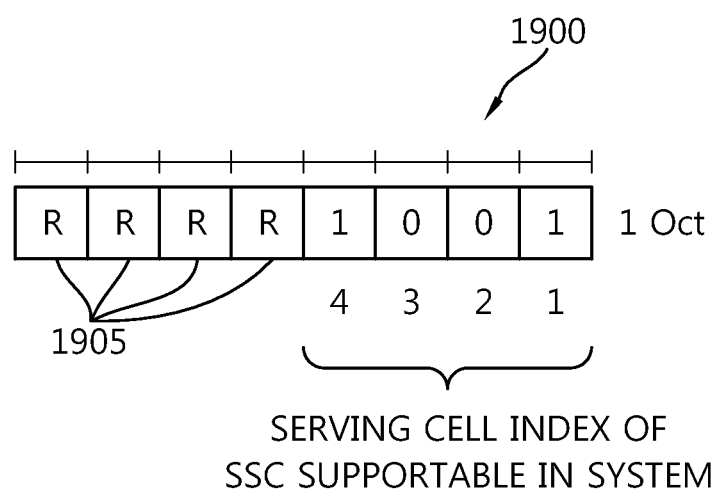
FIG. 19 shows a MAC control element including an activation indicator according to an exemplary embodiment of the present invention.

FIG. 19 shows a MAC control element including an activation indicator according to an exemplary embodiment of the present invention. Here, the number of SSCs supportable in the system is less than the number of the MAC control element including the activation indicator.

Referring to FIG. 19, an activation indication MAC control element 1900 includes at least one R field 1905. If the number of SSCs supportable in the system is k and the number of bits of the activation indication MAC control element 1900 is m, then (m−k) bits, having a length corresponding to the number of remaining bits in the activation indication MAC control element 1900, are reserved as the R field 1905 for other usages (e.g., a usage of activating/deactivating a UL CC independently from a DL CC). For example, if m=8 and k=4, since 4 bits (i.e., 8−4) are not used for a serving cell index, these bits are constructed as the R field 1905.

Therefore, the activation indication MAC control element 1900 is expressed by 'RRR1001', and the remaining 4 bits (i.e., '1001') other than the R field 1905 respectively correspond to serving cell indices of the SSCs supportable in the system in an order of {4, 3, 2, 1}. That is, an order according to which the serving cell indices are mapped to the 4 bits is determined on the basis of the serving cell indices of the SSCs supportable in the system.

According to the number of SSCs configured in the UE, the 4 bits indicate different information as follows. If the 4 bits are 'abcd', the serving cell indices {4, 3, 2, 1} sequentially correspond to the bits a, b, c, and d.

For example, it is assumed that all SSCs supportable in the system are configured in the UE. Since the 4 bits are '1001' (a=d=1, b=c=0), this indicates that only CCs corresponding to the serving cell indices {1, 4} are activated, and CCs corresponding to the remaining serving cell indices {2, 3} are deactivated. Herein, since a serving cell index 0 indicates a PSC, it is not indicated in the activation indication MAC control element 1900, but it is implicitly regarded as being activated.

For another example, it is assumed that only SSCs having the serving cell indices {4, 3, 1} are configured in the UE among the SSCs supportable in the system. Since an SSC having the serving cell index {2} is not configured in the UE, among the 4 bits, a bit corresponding to the serving cell index {2} (i.e., the bit c) is set to 0, and may always be set to 0, such as 'ab0d'. In this case, the UE ignores the bit c corresponding to the serving cell not configured in the UE. Further, since the 4 bits are '1001' (a=d=1, b=0), CCs corresponding to the serving cell indices {1, 4} are activated, and a CC corresponding to the serving cell index {3} is deactivated.

As such, if an SSC of the serving cell index {3} corresponding to the bit c is configured in the UE, c=0 indicates deactivation of the SSC. In this case, the UE does not ignore the bit c, but determines whether the bit is set to 0 or 1. Otherwise, if the SSC of the serving cell index {3} corresponding to the bit c is not configured in the UE, c=0 indicates non-configuration of the SSC. Since the UE can recognize that the bit c is 0 in any case, the UE ignores the bit c.

Figure 20:
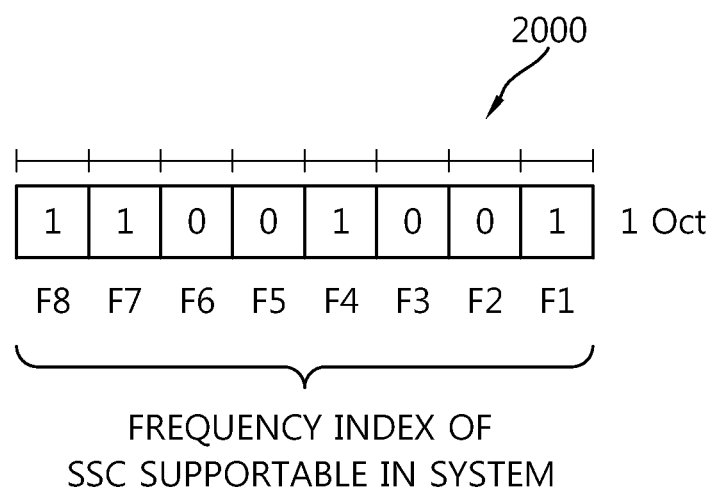
FIG. 20 shows a MAC control element including an activation indicator according to an exemplary embodiment of the present invention.

FIG. 20 shows a MAC control element including an activation indicator according to an exemplary embodiment of the present invention. Here, a serving cell index is an index of a physical center frequency of each serving cell (or CC), and the number of SSCs supportable in the system is equal to the number of bits of the MAC control element including the activation indicator.

Referring to FIG. 20, an activation indication MAC control element 2000 including the activation indicator has a length of 8 bits. Each bit of the activation indication MAC control element 2000 corresponds to a frequency index Fi of an SSC in a one-to-one manner. For example, frequency indices 1 and 4 of the SSC respectively correspond to an $8^{th}$ bit and a $4^{th}$ bit of the activation indication MAC control element 2000. Herein, Fi denotes an index for a center frequency i of the SSC (or CC). For example, F1, F2, and F3 are frequency indices indicating 100 MHz, 120 MHz, and 140 MHz, respectively. Of course, this is for exemplary purposes only, and a frequency size is not necessarily increased in an ascending order of a frequency index. The frequency size may be decreased or may be defined randomly or without any order or relation to the other frequency sizes.

If a PSC is always activated between the eNB and the UE, the activation indicator does not have to additionally indicate a frequency index for the PSC. Therefore, the activation indication MAC control element 2000 can indicate activation/deactivation regarding up to 8 SSCs. If the frequency index of the PSC is F0, frequency indices of the remaining SSCs can be given to F1 to F8. Therefore, as shown in FIG. 20, the frequency indices F1 to F8 are sequentially mapped respectively from an $8^{th}$ bit to a $1^{st}$ bit of the activation indication MAC control element 2000.

Frequency indices of SSCs supportable in the system are {F1, F2, F3, F4, F5, F6, F7, F8}, and all of the SSCs are configured in the UE. Among them, frequency indices of activated SSCs are {F1, F4, F7, F8}. Therefore, the activation indication MAC control element 2000 is expressed by '11001001'.

However, this is for exemplary purposes only, and thus the frequency indices F1 to F8 can be sequentially mapped respectively from the $1^{st}$ bit to the $8^{th}$ bit of the activation indication MAC control element 2000, or may be randomly mapped.

Figure 21:
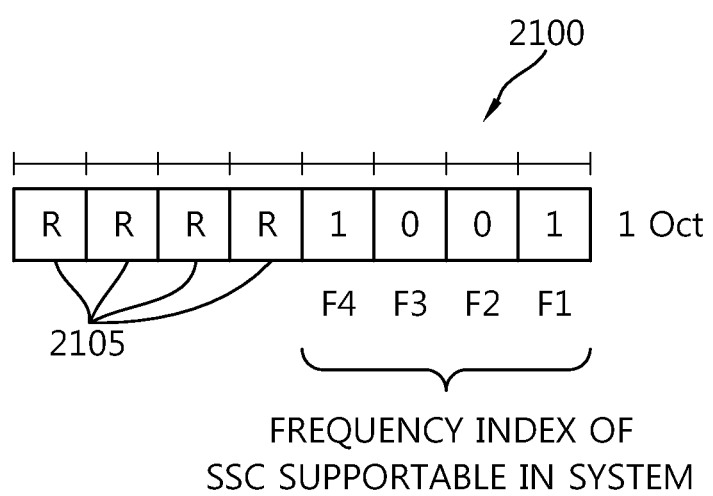
FIG. 21 shows a MAC control element including an activation indicator according to an exemplary embodiment of the present invention.

FIG. 21 shows a MAC control element including an activation indicator according to an exemplary embodiment of the present invention. Here, a serving cell index is an index of a physical center frequency of each serving cell, and the number of SSCs supportable in the system is less than the number of bits of the MAC control element including the activation indicator.

Referring to FIG. 21, an activation indication MAC control element 2100 includes at least one R field 2105. If the number of SSCs configured in the UE is k and the number of bits of the activation indication MAC control element 2100 is m, then (m−k) bits, having a length corresponding to the number of remaining bits in the activation indication MAC control element 2100, are reserved for other usages (e.g., a usage of activating/deactivating a UL CC independently from a DL CC). For example, if the number of bits of the activation indication MAC control element 2100 is 8 and the maximum number of serving cells supportable in the system is 4, since 4 bits (i.e., 8−4) are not used for a frequency index of an SSC, these bits are constructed as the R field 2105.

Therefore, the activation indication MAC control element 2100 is expressed by 'RRR1001', and the remaining last 4 bits other than the R field 2105 respectively correspond to frequency indices {F4, F3, F2, F1} of the SSC supportable in the system. Since the last 4 bits are '1001', this indicates that only CCs corresponding to the frequency indices {F4, F1} are activated, and CCs corresponding to the remaining frequency indices {F3, F2} are deactivated. Herein, since the frequency index F0 indicates a PSC, even through it is not indicated by the activation indicator, the PSC is implicitly regarded as being activated. However, the index of the PSC is not necessarily F0, and thus can be given to another index. In this case, the index of the PSC is excluded from the activation indicator.

Meanwhile, if the number of SSCs configured in the UE is less than the maximum number of CCs supportable in the system, a bit corresponding to a frequency index of a non-configured SSC in the activation indication MAC control element 2100 is set to 0. In this case, the UE ignores the bit corresponding to the SSC not configured in the UE.

Although it is described herein that the number of R fields 2105 is 4, this for exemplary purposes only, and thus the R field 2105 may not exist or the number of R fields 2105 may be greater (or fewer) than or equal to 4.

Figure 22:
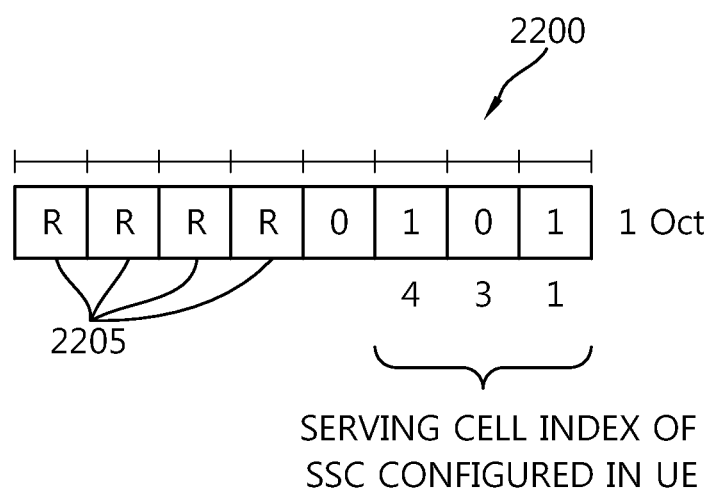
FIG. 22 shows a MAC control element including an activation indicator according to an exemplary embodiment of the present invention.

FIG. 22 shows a MAC control element including an activation indicator according to an exemplary embodiment of the present invention. Here, the number of SSCs configured in the UE is less than the number of SSCs supportable in the system. Herein, whether the number of supportable SSCs is equal to or different from the number of bits of an activation indication MAC control element is not a matter of concern in particular. However, for convenience of explanation, it is assumed that the number of supportable SSCs is less than the total number of bits of the activation indication MAC control element, and the activation indication MAC control element includes at least one R field.

Referring to FIG. 22, an activation indication MAC control element 2200 includes 4 R fields 2205 and 4 bits. The number of SSCs supportable in the system is 4, and serving cell indices of the SSCs are {4, 3, 2, 1}. Among the 4 SSCs, x cells are configured in the UE (where x≤4). In this case, an order of mapping the serving cell indices to the 4 bits is determined on the basis of serving cell indices for the x SSCs and is not determined on the basis of the serving cell indices of the 4 SSCs supportable in the system.

If serving cell indices of 3 SSCs configured in the UE are {4, 3, 1}, any 3 bits out of the 4 bits indicate activation/deactivation of the 3 SSCs, and the remaining 1 bit is set to 0, and may always be set to 0. For example, if the 4 bits are 'abcd', the bit a is 0, and the remaining bits b, c, and d correspond to the serving cell indices of the 3 SSCs. In the example of FIG. 22, the serving cell indices {4, 3, 1} sequentially correspond to the bits b, c, and d, respectively. Since bcd=101, the activation indication MAC control element 2200 indicates activation of CCs corresponding to the serving cell indices {4, 1} and indicates deactivation of a CC corresponding to the serving cell index {3}. Of course, this is for exemplary purposes only, and thus any one of the bits b, c, and d can be set to 0. For example, if c=0, this example is the same as the example of FIG. 19.

Although it is described herein that the number of R fields 2205 is 4, this is for exemplary purposes only, and thus the R field 2205 may not exist or the number of R fields 2205 may be greater than (or fewer than) or equal to 4.

Figure 23:
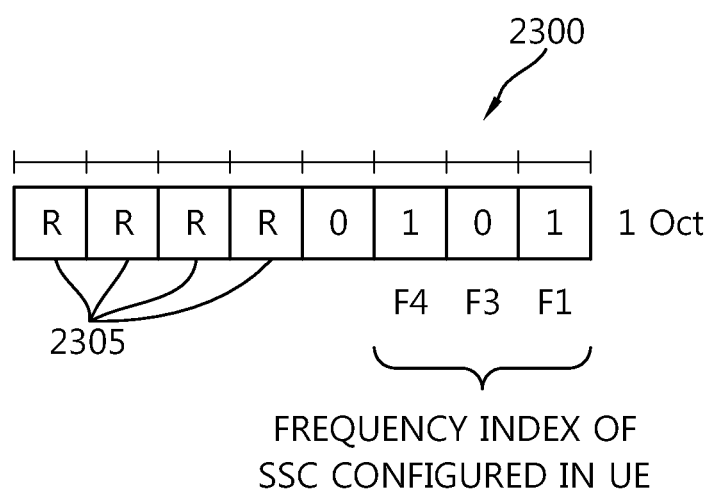
FIG. 23 shows a MAC control element including an activation indicator according to an exemplary embodiment of the present invention.

FIG. 23 shows a MAC control element including an activation indicator according to an exemplary embodiment of the present invention. Here, the number of SSCs configured in the UE is less than the number of SSCs supportable in the system, and a serving cell index is an index of a physical center frequency of each serving cell.

Referring to FIG. 23, an activation indication MAC control element 2300 includes 4 R fields 2305 and 4 bits. The number of SSCs supportable in the system is 4, and frequency indices of the SSCs are {F4, F3, F2, F1}. Among the 4 SSCs, x cells are configured in the UE (where x≥4). In this case, an order of mapping the serving cell index to the 4 bits is determined on the basis of serving cell indices for the x SSCs and is not determined on the basis of the serving cell indices of the 4 SSCs supportable in the system.

If frequency indices of 3 SSCs configured in the UE are {F4, F3, F1}, any 3 bits out of the 4 bits indicate activation/deactivation of the 3 SSCs, and the remaining 1 bit is set to 0, and may always be set to 0. For example, if the 4 bits are 'abcd', the bit a is 0, and the remaining bits b, c, and d correspond to the serving cell indices of the 3 SSCs. In the example of FIG. 23, the frequency indices {F4, F3, F1} sequentially correspond to the bits b, c, and d, respectively. Since bcd=101, the activation indication MAC control element 2300 indicates activation of CCs corresponding to the frequency indices {F4, F1} and indicates deactivation of a CC corresponding to the frequency index {F3}. Of course, this is for exemplary purposes only, and thus any one of the bits b, c, and d can be set to 0. For example, if c=0, this example is the same as the example of FIG. 21.

Although it is described herein that the number of R fields 2305 is 4, this is for exemplary purposes only, and thus the R field 2305 may not exist or the number of R fields 2205 may be greater (or fewer) than or equal to 4.

Figure 24:
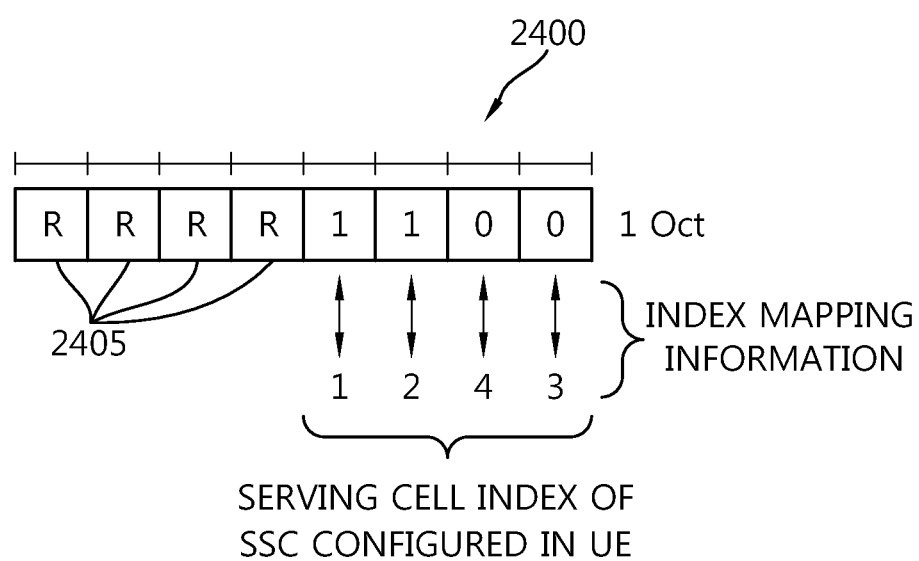
FIG. 24 shows a MAC control element including an activation indicator according to an exemplary embodiment of the present invention.

FIG. 24 shows a MAC control element including an activation indicator according to an exemplary embodiment of the present invention. Here, the eNB reports to the UE that respective bits of an activation indication MAC control element correspond to serving cell indices arranged in a specific order by using RRC signaling, and the number of SSCs configured in the UE is equal to the number of SSCs supportable in the system. Herein, whether the number of supportable SSCs is equal to or different from the number of bits of the activation indication MAC control element is not a matter of concern in particular. However, for convenience of explanation, it is assumed that the number of supportable SSCs is less than the total number of bits of the activation indication MAC control element, and the activation indication MAC control element includes at least one R field.

Referring to FIG. 24, an activation indication MAC control element 2400 includes 4 R fields 2405 and 4 bits. The number of SSCs supportable in the system is 4, and serving cell indices of the SSCs are respectively {4, 3, 2, 1}, and all of them are configured in the UE.

In FIG. 17 to FIG. 23, it is assumed that a correspondence relation between a bit and a serving cell index is previously known between the eNB and the UE without additional signaling. Unlike this, in FIG. 24, index mapping information for indicating a mapping relation between a bit position and a serving cell index of an SSC supportable in the system is transmitted by the eNB to the UE. The UE receives the index mapping information, and determines the mapping relation between the bit position and the serving cell index by using the index mapping information. Thereafter, if the eNB confirms that the UE receives the index mapping information, the eNB transmits the activation indicator to the UE. The index mapping information may be any one of a MAC message, an RRC message, and a physical layer message.

For example, if the 4 bits are 'abcd', the bits a, b, c, and d respectively correspond to 4 serving cell indices. According to the index mapping information of FIG. 24, the serving cell index {1} is mapped to the bit a, the serving cell index {2} is mapped to the bit b, the serving cell index {4} is mapped to the bit c, and the serving cell index {3} is mapped to the bit d.

The UE determines a serving cell index to be mapped to each bit position on the basis of the index mapping information, and then determines activation/deactivation of each SSC on the basis of the activation indication MAC control element 2400 including the activation indicator. The remaining 4 bits other than the R field 2405 in the activation indication MAC control element 2400 are abcd=1100. Therefore, the activation indication MAC control element 2400 indicates activation of CCs corresponding to the serving cell indices {1, 2} and indicates deactivation of CCs corresponding to the serving cell indices {3, 4}. Accordingly, the UE does not receive the CCs corresponding to the serving cell indices {3, 4} but receives the CCs corresponding to the serving cell indices {1, 2}.

Figure 25:
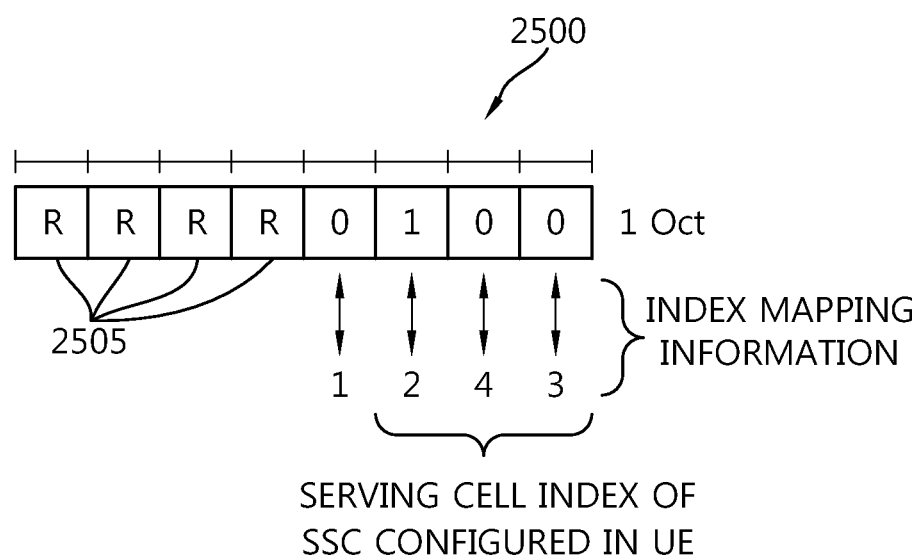
FIG. 25 shows a MAC control element including an activation indicator according to an exemplary embodiment of the present invention.

FIG. 25 shows a MAC control element including an activation indicator according to an exemplary embodiment of the present invention. Here, the eNB reports to the UE that respective bits of an activation indication MAC control element correspond to serving cell indices arranged in a specific order by using RRC signaling, and the number of SSCs configured in the UE is less than the number of SSCs supportable in the system. Herein, whether the number of supportable SSCs is equal to or different from the number of bits of the activation indication MAC control element is not a matter of concern in particular. However, for convenience of explanation, it is assumed that the number of supportable SSCs is less than the total number of bits of the activation indication MAC control element, and the activation indication MAC control element includes at least one R field.

Referring to FIG. 25, an activation indication MAC control element 2500 includes 4 R fields 2505 and 4 bits. The number of SSCs supportable in the system is 4, and serving cell indices of the SSCs are respectively {4, 3, 2, 1}. Among them, SSCs corresponding to {2, 4, 3} are configured in the UE.

The eNB first transmits index mapping information to the UE. If the 4 bits are 'abcd', mapping between SSCs supportable in the system can be achieved as follows. That is, the serving cell index {1} is mapped to the bit a, the serving cell index {2} is mapped to the bit b, the serving cell index {4} is mapped to the bit c, and the serving cell index {3} is mapped to the bit d. That is, a mapping relation of abcd ⇔ {1, 2, 4, 3} is satisfied.

However, since the SSC having the serving cell index {1} is not configured in the UE, the bit a is set to 0. Since the remaining bits are bcd=100, the activation indication MAC control element 2500 indicates activation of the SSC having the serving cell index {2} and indicates deactivation of the SSCs having the serving cell indices {3, 4}.

2. Structure of Activation Indicator for Case 2

Unlike in Case 1, an activation indicator for Case 2 not only includes an SSC but also explicitly includes indication of activation/deactivation of a PSC. Therefore, at least one bit of an activation indication MAC control element corresponds to a serving cell index, and in this sense, the structure of the activation indicator for Case 2 is different from that of Case 1. Hereinafter, a serving cell includes both the PSC cell and the SSC. In addition, a serving cell index refers to both a serving cell index of the PSC and a serving cell index of the SSC. A frequency index and the serving cell index of the PSC may be determined differently for each UE and/or for each eNB. However, except for a special case, for consistency of overall explanations herein, the serving cell index of the PSC is 0 and the frequency index of the PSC is F0.

Figure 26:
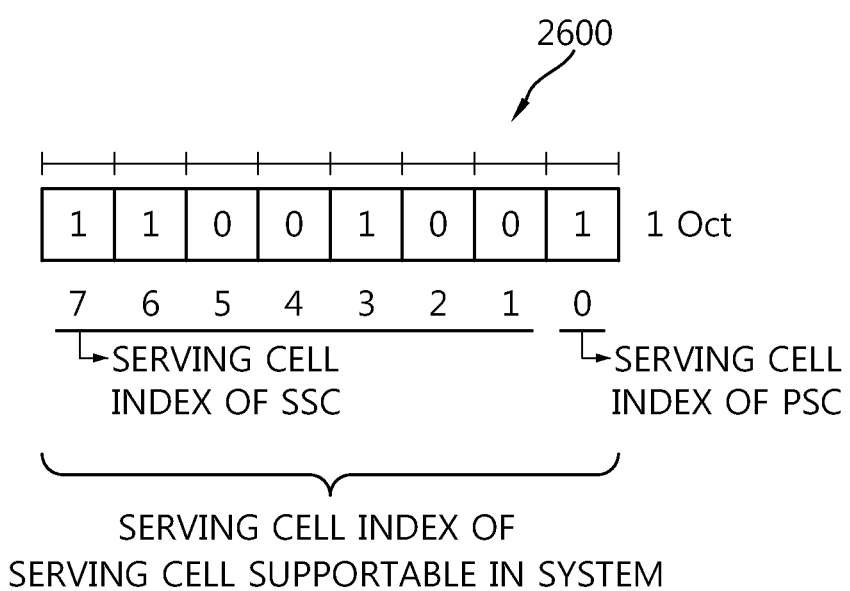
FIG. 26 shows a MAC control element including an activation indicator according to an exemplary embodiment of the present invention.

FIG. 26 shows a MAC control element including an activation indicator according to an exemplary embodiment of the present invention. Here, the number of serving cells supportable in the system is equal to the number of bits of an activation indication MAC control element, the number of all supportable serving cells is 8, and 8 serving cells are configured in the UE.

Referring to FIG. 26, an activation indication MAC control element 2600 has a length of 8 bits. Bit positions of the activation indication MAC control element 2600 respectively correspond to serving cell indices in a one-to-one manner. Herein, the serving cell index comprises a serving cell index of an SSC or a PSC. The example of FIG. 26 is different from the example of FIG. 17 in that the serving cell index explicitly corresponds to each bit of the activation indication MAC control element 2600. Therefore, the serving cell indices are given to 0, 1, 2, 3, . . . , 7.

Since the activation indication MAC control element 2600 has a length of 8 bits, the activation indicator can indicate one PSC index and 7 SSC indices. That is, the activation indicator can cover up to 8 CCs capable of indicating activation/deactivation.

If all supportable serving cells are configured in the UE, then 8 serving cells are configured in the UE. The activation indication MAC control element 2600 is '11001001', and bits from the left respectively correspond to serving cell indices {7, 6, 5, 4, 3, 2, 1, 0}.

Herein, the index of one PSC is set to a fixed value, i.e., 0. Further, the PSC may always be set to the activation state. Accordingly, the activation indicator for the PSC may always be set to 1.

As described above, since the PSC is in the activation state, and may always be in the activation state, an exemplary embodiment of the present invention may further include a case in which indication information (i.e., an indicator) for indicating the activation state of the PSC is not included in the activation indication MAC control element 2600. That is, an exemplary embodiment of the present invention further includes the activation indication MAC control element 2600 configured with a reserved (R) bit in the absence of the activation indicator for the PSC. In this case, the UE may not analyze a value of the R bit, that is, since the UE is aware that the index of the PSC is 0, the PSC may remain in the activation state without additional analysis.

Therefore, the activation indicator indicates activation of CCs corresponding to the serving cell indices {0, 3, 6, 7}, and indicates deactivation of CCs corresponding to the serving cell indices {1, 2, 4, 5}. An order of a serving cell index corresponding to a position of each bit of the activation indication MAC control element 2600 is for exemplary purposes only, and the serving cell index does not have to be arranged in the order of FIG. 26 and thus may be arranged in another order. However, if there is no additional signaling, the UE and the eNB have to know an order according to which each serving cell index corresponds to each bit of the activation indication MAC control element 2600.

Figure 27:
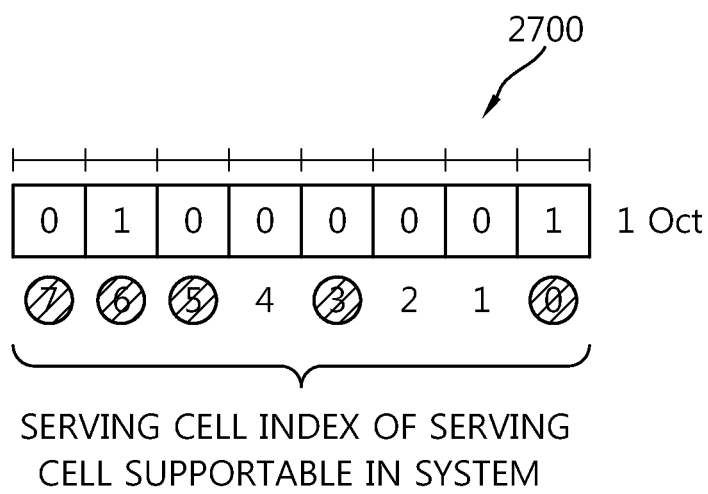
FIG. 27 shows a MAC control element including an activation indicator according to an exemplary embodiment of the present invention.

FIG. 27 shows a MAC control element including an activation indicator according to an exemplary embodiment of the present invention. Here, the number of serving cells supportable in the system is equal to the number of bits of the MAC control element including the activation indicator, and only some of supportable serving cells are configured in the UE.

Referring to FIG. 27, bits of an activation indication MAC control element 2700 are sequentially mapped with all serving cell indices {0, 1, 2, 3, 4, 5, 6, 7}, respectively. First, serving cells not configured in the UE have serving cell indices {1, 2, 4}. Therefore, bits corresponding to {1, 2, 4} are set to 0, and may always be set to 0. Serving cells configured in the UE have serving cell indices {0, 3, 5, 6, 7}. Since the activation indication MAC control element 2700 is '0100001', this indicates activation of serving cells having the serving cell indices {0, 6} and indicates deactivation of serving cells having the serving cell indices {3, 5, 7}. The UE ignores a bit corresponding to an index of a serving cell not configured in the UE.

In addition, the UE may confirm the activation indication MAC control element 2600 configured with the R bit in correspondence with the PSC, and thus the PSC may remain in the activation state without additional analysis on the R bit.

FIG. 26 and FIG. 27 show examples in which the total number of serving cells supportable in the system is equal to the total number of activation indication MAC control elements. However, if the total number of supportable serving cells is less than the total number of bits of the activation indication MAC control element, there is a need to determine how to utilize the remaining bits of the activation indication MAC control element. This will be described below with reference to FIG. 28.

Figure 28:
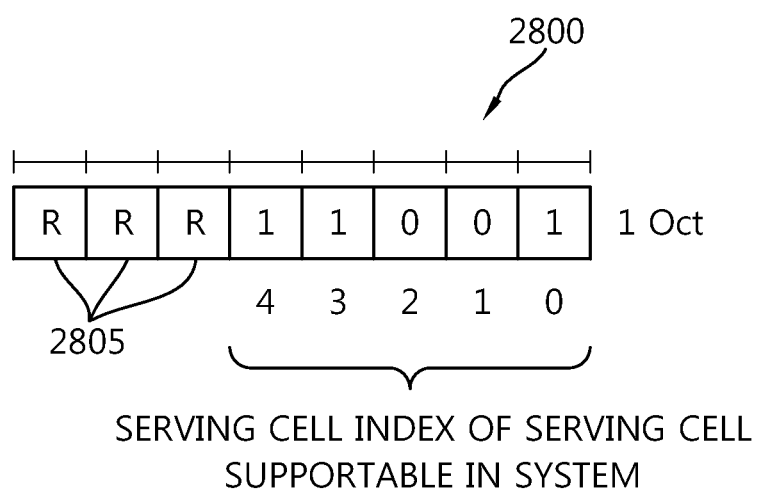
FIG. 28 shows a MAC control element including an activation indicator according to an exemplary embodiment of the present invention.

FIG. 28 shows a MAC control element including an activation indicator according to an exemplary embodiment of the present invention. This is a case in which the number of serving cells supportable in the system is less than the number of bits of the MAC control element including the activation indicator.

Referring to FIG. 28, an activation indication MAC control element 2800 includes at least one R field 2805. If the number of serving cells supportable in the system is k and the number of bits of the activation indication MAC control element 2800 is m, then (m−K) bits, having a length corresponding to the number of remaining bits in the activation indication MAC control element 2800, are reserved as the R field 2805 for other usages (e.g., a usage of activating/deactivating a UL CC independently from a DL CC). For example, if m=8 and k=5, then, since 3 bits (i.e., 8−5) are not used for a serving cell index, these bits are constructed as the R field 2805.

Therefore, the activation indication MAC control element 2800 is expressed by 'RR11001', and the remaining 5 bits (i.e., '11001') other than the R field 2805 respectively correspond to serving cell indices of the serving cells supportable in the system in an order of {4, 3, 2, 1, 0}. That is, an order according to which the serving cell index is mapped to the 5 bits is determined based on a serving cell index of the serving cells supportable in the system.

According to the number of serving cells configured in the UE, the 5 bits indicate different information as follows. If the 5 bits are 'abcde', the serving cell indices {4, 3, 2, 1, 0} sequentially correspond to the bits a, b, c, d, and e.

For example, it is assumed that all serving cells supportable in the system are configured in the UE. Since the 5 bits are '11001' (a=b=e=1, c=d=0), this indicates that only CCs corresponding to the serving cell indices {0, 3, 4} are activated, and CCs corresponding to the remaining serving cell indices {1, 2} are deactivated. Herein, a serving cell index 0 is a serving cell index of a PSC.

For another example, it is assumed that only serving cells having the serving cell indices {4, 3, 1, 0} are configured in the UE among the serving cells supportable in the system. That is, a serving cell having the serving cell index {2} is not configured in the UE. In this case, among the 5 bits, a bit corresponding to the serving cell index {2}, i.e., the bit c, is set to 0, and may always be set to 0, such as 'ab0de'. In this case, the UE ignores the bit c corresponding to the serving cell not configured in the UE. Further, since the 5 bits are '11001' (a=b=e=1, d=0), this indicates that the CCs corresponding to the serving cell indices {0, 3, 4} are activated, and the CC corresponding to the serving cell index {1} is deactivated.

Figure 29:
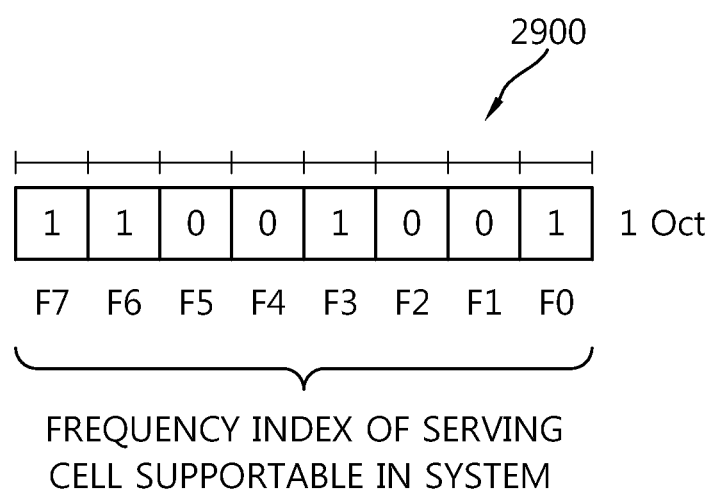
FIG. 29 shows a MAC control element including an activation indicator according to an exemplary embodiment of the present invention.

FIG. 29 shows a MAC control element including an activation indicator according to an exemplary embodiment of the present invention. Here, a serving cell index is an index of a physical center frequency of each serving cell (or CC), and the number of serving cells supportable in the system is equal to the number of bits of the MAC control element including the activation indicator.

Referring to FIG. 29, an activation indication MAC control element 2900 including the activation indicator has a length of 8 bits. Each bit of the activation indication MAC control element 2900 corresponds to a frequency index Fi of a serving cell in a one-to-one manner. For example, frequency indices 1 and 4 of the serving cell respectively correspond to an $8^{th}$ bit and a $4^{th}$ bit of the activation indication MAC control element 2900. Herein, Fi denotes an index for a center frequency i of the serving cell (or CC). For example, F0, F1, F2, and F3 are frequency indices indicating 90 MHz, 100 MHz, 120 MHz, and 140 MHz, respectively. Of course, this is for exemplary purposes only, and a frequency size is not necessarily increased in an ascending order of a frequency index. The frequency size may be decreased or may be defined randomly or without any order or relation to the other frequency sizes.

The activation indication MAC control element 2900 can indicate activation/deactivation regarding up to 8 serving cells. If the frequency index of the PSC is F0, frequency indices of the remaining SSCs can be given to F1 to F7. Therefore, as shown in FIG. 29, the frequency indices F1 to F7 are sequentially mapped respectively from an $8^{th}$ bit to a $1^{st}$ bit of the activation indication MAC control element 2900.

Frequency indices of serving cells supportable in the system are {F0, F1, F2, F3, F4, F5, F6, F7}, and all of the serving cells are configured in the UE. Among them, frequency indices of activated serving cells are {R, F3, F6, F7}. Therefore, the activation indication MAC control element 2900 is expressed by '11001001'.

However, this is for exemplary purposes only, and thus the frequency indices F0 to F7 can be sequentially mapped respectively from the $1^{st}$ bit to the $8^{th}$ bit of the activation indication MAC control element 2900, or may be randomly mapped.

Figure 30:
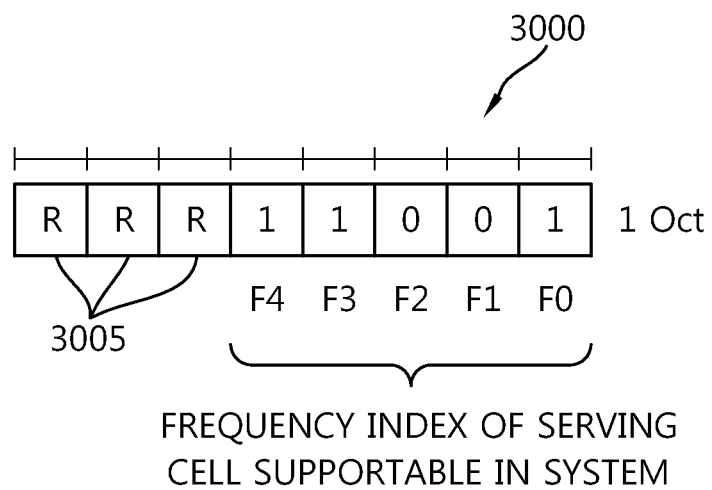
FIG. 30 shows a MAC control element including an activation indicator according to an exemplary embodiment of the present invention.

FIG. 30 shows a MAC control element including an activation indicator according to an exemplary embodiment of the present invention. Here, a serving cell index is an index of a physical center frequency of each serving cell, and the number of serving cells supportable in the system is less than the number of bits of the MAC control element constructing the activation indicator.

Referring to FIG. 30, an activation indication MAC control element 3000 includes at least one R field 3005. If the number of serving cells configured in the UE is k and the number of bits of the activation indication MAC control element 3000 is m, then (m−k) bits, having a length corresponding to the number of remaining bits in the activation indication MAC control element 3000, are reserved for other usages (e.g., a usage of activating/deactivating a UL CC independently from a DL CC). For example, if the number of bits of the activation indication MAC control element 3000 is 8 and the maximum number of serving cells supportable in the system is 5, then, since 3 bits (i.e., 8−5) are not used for a frequency index of a serving cell, these bits are constructed as the R field 3005.

Therefore, the activation indication MAC control element 3000 is expressed by 'RR11001', and the remaining last 5 bits other than the R field 3005 respectively correspond to frequency indices {F4, F3, F2, F1, F0} of the serving cell supportable in the system. Since the last 5 bits are '11001', this indicates that only CCs corresponding to the frequency indices {F4, F3, F0} are activated, and CCs corresponding to the remaining frequency indices {F2, F1} are deactivated.

Meanwhile, if the number of serving cells configured in the UE is less than the maximum number of CCs supportable in the system, a bit corresponding to a non-configured serving cell in the activation indication MAC control element 3000 is set to 0. In this case, the UE ignores the bit corresponding to the serving cell not configured in the UE.

Although it is described herein that the number of R fields 3005 is 3, this for exemplary purposes only, and thus the R field 3005 may not exist or the number of R fields 3005 may be greater (or fewer) than or equal to 3.

Figure 31:
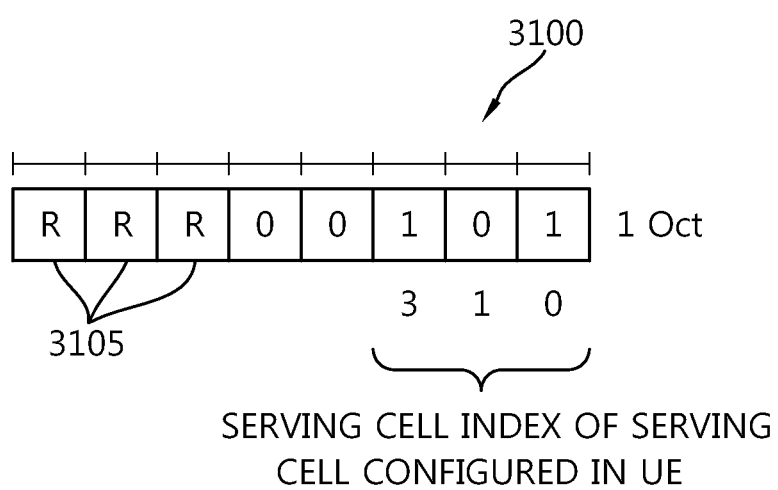
FIG. 31 shows a MAC control element including an activation indicator according to an exemplary embodiment of the present invention.

FIG. 31 shows a MAC control element including an activation indicator according to an exemplary embodiment of the present invention. Here, the number of serving cells configured in the UE is less than the number of serving cells supportable in the system. Herein, whether the number of supportable serving cells is equal to or different from the number of bits of an activation indication MAC control element is not a matter of concern in particular. However, for convenience of explanation, it is assumed that the number of supportable serving cells is less than the total number of bits of the activation indication MAC control element, and the activation indication MAC control element includes at least one R field.

Referring to FIG. 31, an activation indication MAC control element 3100 includes 3 R fields 3105 and 5 bits. The number of serving cells supportable in the system is 5, and serving cell indices of the serving cells are {4, 3, 2, 1, 0}. Among the 5 serving cells, x cells are configured in the UE (where x≤5). In this case, an order of mapping the serving cell index to the 5 bits is determined on the basis of serving cell indices for the x serving cells and is not determined on the basis of the serving cell indices of the 5 serving cells supportable in the system.

If serving cell indices of 3 serving cells configured in the UE are {3, 1, 0}, any 3 bits out of the 5 bits indicate activation/deactivation of the 3 serving cells, and the remaining 2 bits are set to 0, and may always be set to 0. For example, if the 5 bits are 'abcde', the bits a and b are 0, and the remaining bits c, d, and e correspond to the serving cell indices of the 3 serving cells. In the example of FIG. 31, the serving cell indices {3, 1, 0} sequentially correspond to the bits c, d, and e, respectively. Since cde=101, the activation indication MAC control element 3100 indicates activation of CCs corresponding to the serving cell indices {3, 0} and indicates deactivation of a CC corresponding to the serving cell index {1}. Of course, this is for exemplary purposes only, and thus any one of the bits a, b, c, d, and e can be set to 0, or may always be set to 0.

Although it is described herein that the number of R fields 3105 is 3, this is for exemplary purposes only, and thus the R field 3105 may not exist or the number of R fields 3105 may be greater (or fewer) than or equal to 3.

Figure 32:
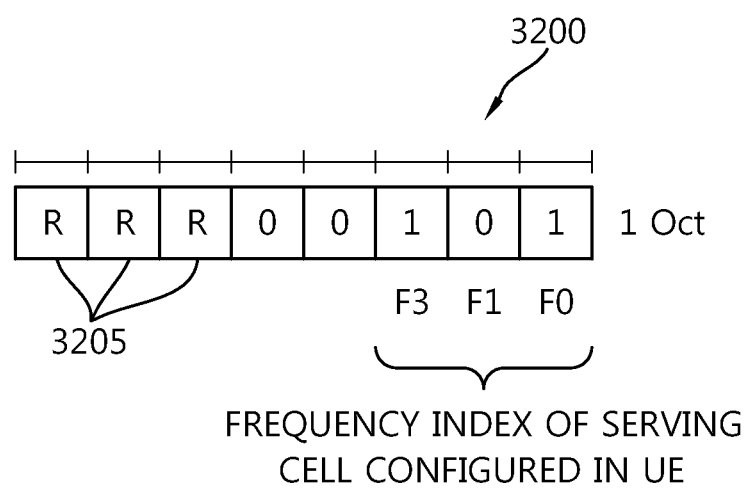
FIG. 32 shows a MAC control element including an activation indicator according to an exemplary embodiment of the present invention.

FIG. 32 shows a MAC control element including an activation indicator according to an exemplary embodiment of the present invention. This is a case in which the number of serving cells configured in the UE is less than the number of serving cells supportable in the system, and a serving cell index is an index of a physical center frequency of each serving cell.

Referring to FIG. 32, an activation indication MAC control element 3200 includes 3 R fields 3205 and 5 bits. The number of serving cells supportable in the system is 5, and frequency indices of the serving cells are {F4, F3, F2, F1, F0}. Among the 5 serving cells, x cells are configured in the UE (where x≤5). In this case, an order of mapping the serving cell index to the 5 bits is determined on the basis of serving cell indices for the x serving cells and is not determined on the basis of the serving cell indices of the 5 serving cells supportable in the system.

If frequency indices of 3 serving cells configured in the UE are {F3, F1, F0}, any 3 bits out of the 5 bits indicate activation/deactivation of the 3 serving cells, and the remaining 2 bits are set to 0, and may always be set to 0. For example, if the 5 bits are 'abcde', the bits a and b are 0, and the remaining bits c, d, and e correspond to the serving cell indices of the 3 serving cells. In the example of FIG. 32, the frequency indices {F3, F1, F0} sequentially correspond to the bits c, d, and e, respectively. Since cde=101, the activation indication MAC control element 3200 indicates activation of CCs corresponding to the frequency indices {F3, F0} and indicates deactivation of a CC corresponding to the frequency index {F1}. Of course, this is for exemplary purposes only, and thus any one of the bits a, b, c, d, and e can be set to 0, or always set to 0.

Although it is described herein that the number of R fields 3205 is 3, this is for exemplary purposes only, and thus the R field 3205 may not exist or the number of R fields 3205 may be greater (or fewer) than or equal to 3.

Figure 33:
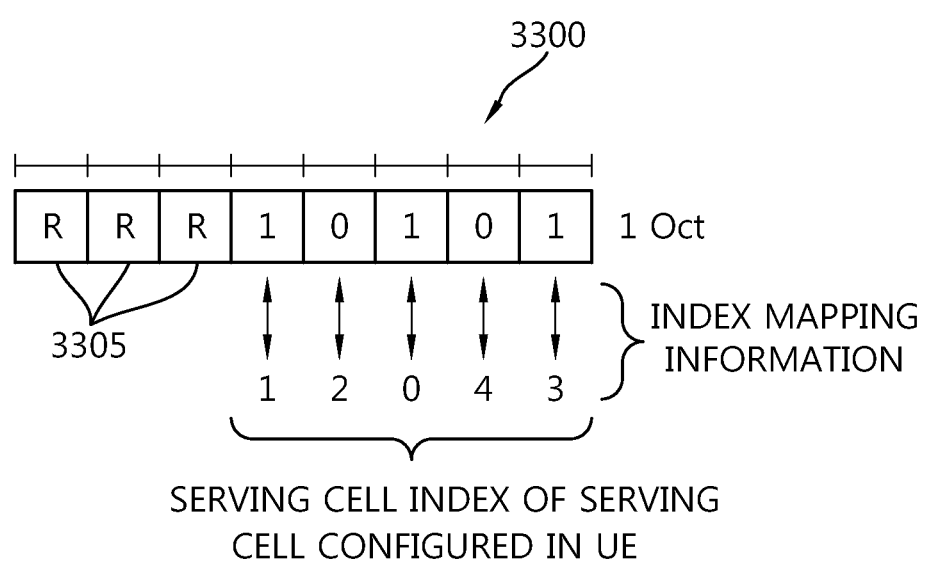
FIG. 33 shows a MAC control element including an activation indicator according to an exemplary embodiment of the present invention.

FIG. 33 shows a MAC control element including an activation indicator according to an exemplary embodiment of the present invention. Here, the eNB reports to the UE that respective bits of an activation indication MAC control element correspond to serving cell indices arranged in a specific order by using RRC signaling, and the number of serving cells configured in the UE is equal to the number of serving cells supportable in the system. Herein, whether the number of supportable serving cells is equal to or different from the number of bits of the activation indication MAC control element is not a matter of concern in particular. However, for convenience of explanation, it is assumed that the number of supportable serving cells is less than the total number of bits of the activation indication MAC control element, and the activation indication MAC control element includes at least one R field.

Referring to FIG. 33, an activation indication MAC control element 3300 includes 3 R fields 3305 and 5 bits. The number of serving cells supportable in the system is 5, and serving cell indices of the serving cells are respectively {0, 1, 2, 3, 4}, and all of them are configured in the UE.

In FIG. 26 to FIG. 32, it is assumed that a correspondence relation between a bit and a serving cell index is previously known between the eNB and the UE without additional signaling. Unlike this, in FIG. 33, the UE maps a serving cell index and each bit position by using index mapping information for indicating a mapping relation between a bit position and a serving cell index of a serving cell supportable in the system.

For example, if the 5 bits are 'abcde', the bits a, b, c, d, and e respectively correspond to 5 serving cell indices. According to the index mapping information of FIG. 33, the serving cell index {1} is mapped to the bit a, the serving cell index {2} is mapped to the bit b, the serving cell index {0} is mapped to the bit c, the serving cell index {4} is mapped to the bit d, and the serving cell index {3} is mapped to the bit e.

The UE determines a serving cell index to be mapped to each bit position on the basis of the index mapping information, and then determines activation/deactivation of each serving cell on the basis of the activation indication MAC control element 3300 including the activation indicator. The remaining 5 bits other than the R field 3305 in the activation indication MAC control element 3300 are abcde=10101. Therefore, the activation indication MAC control element 3300 indicates activation of CCs corresponding to the serving cell indices {1, 0, 3} and indicates deactivation of CCs corresponding to the serving cell indices {2, 4}. Accordingly, the UE does not receive the CCs corresponding to the serving cell indices {2, 4} but receives the CCs corresponding to the serving cell indices {1, 0, 3}.

Figure 34:
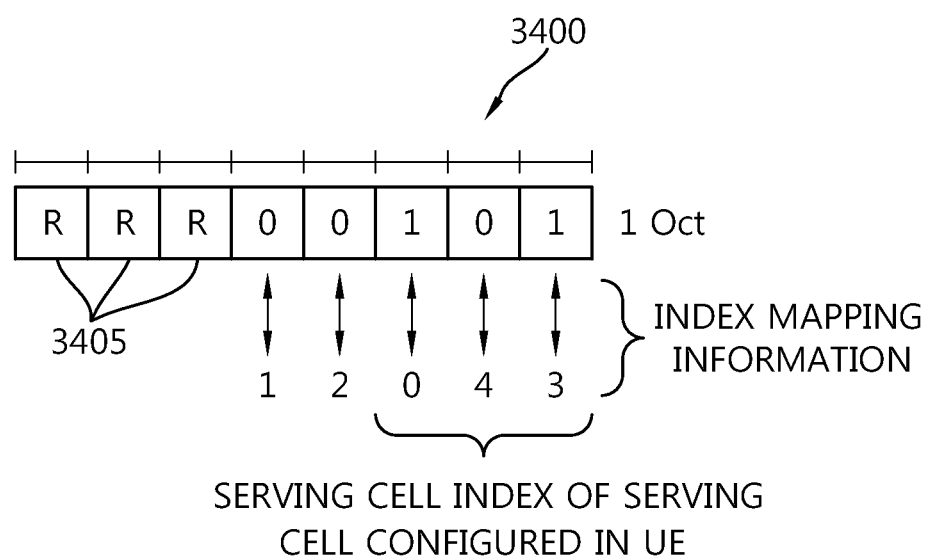
FIG. 34 shows a MAC control element including an activation indicator according to an exemplary embodiment of the present invention.

FIG. 34 shows a MAC control element including an activation indicator according to an exemplary embodiment of the present invention. Here, the eNB reports to the UE that respective bits of an activation indication MAC control element correspond to serving cell indices arranged in a specific order by using RRC signaling, and the number of serving cells configured in the UE is less than the number of serving cells supportable in the system. Herein, whether the number of supportable serving cells is equal to or different from the number of bits of the activation indication MAC control element is not a matter of concern in particular. However, for convenience of explanation, it is assumed that the number of supportable serving cells is less than the total number of bits of the activation indication MAC control element, and the activation indication MAC control element includes at least one R field.

Referring to FIG. 34, an activation indication MAC control element 3400 includes 3 R fields 3405 and 5 bits. The number of serving cells supportable in the system is 5, and serving cell indices of the serving cells are respectively {0, 1, 2, 3, 4}. Among them, serving cells corresponding to {0, 3, 4} are configured in the UE.

The eNB first transmits index mapping information to the UE. If the 5 bits are 'abcde', mapping between serving cells supportable in the system can be achieved as follows. That is, the serving cell index {1} is mapped to the bit a, the serving cell index {2} is mapped to the bit b, the serving cell index {0} is mapped to the bit c, the serving cell index {4} is mapped to the bit d, and the serving cell index {3} is mapped to the bit e. That is, a mapping relation of abcde ⇔ {1, 2, 0, 4, 3} is satisfied.

However, since the serving cells corresponding to the serving cell indices {1, 2} are not configured in the UE, the bits a and b are set to 0, and may always be set to 0. Since the remaining bits are cde=101, the activation indication MAC control element 3400 indicates activation of the serving cells corresponding to the serving cell indices {0, 3} and indicates deactivation of the serving cell corresponding to the serving cell index {4}.

Figure 35:
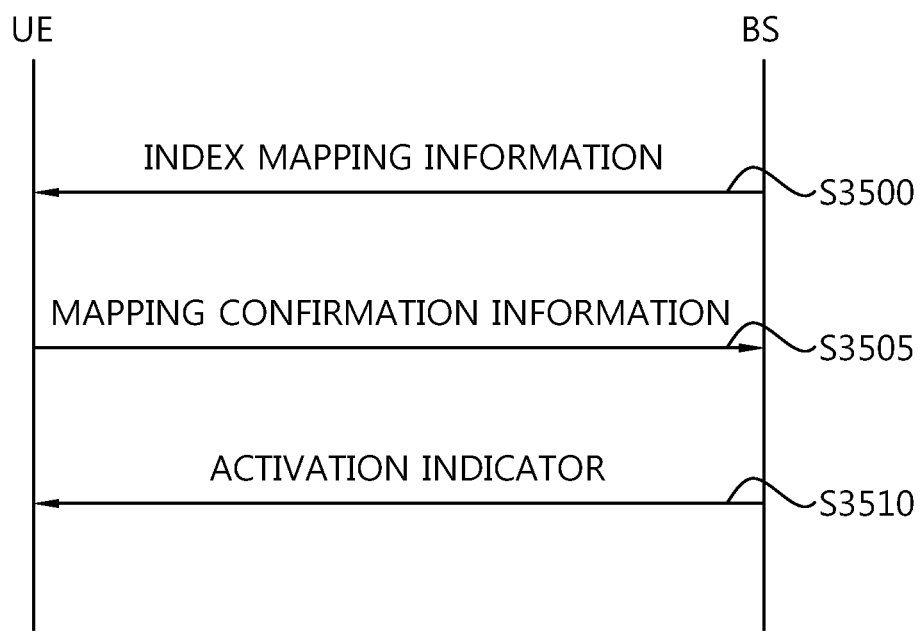
FIG. 35 is a flowchart showing a method for transmitting an activation indicator according to an exemplary embodiment of the present invention.

FIG. 35 is a flowchart showing a method for transmitting an activation indicator according to an exemplary embodiment of the present invention. Referring to FIG. 35, an eNB transmits index mapping information to a UE (operation S3500). The index mapping information is information for indicating a mapping relation between a bit position and a serving cell index of an SSC supportable in the system. The UE may allow each bit of an activation indication MAC control element to be received afterwards to correspond to a serving cell index on the basis of the index mapping information. If the index mapping information is successfully received, and each bit of the activation indication MAC control element is allowed to correspond to the serving cell index on the basis of the index mapping information, the UE transmits mapping confirmation information to the eNB (operation S3505).

The index mapping information and the mapping confirmation information may be any one of a MAC message, an RRC message, and a physical layer message.

The eNB transmits the activation indicator to the UE (operation S3510). The activation indicator may have the structure described with reference to FIG. 16 to FIG. 34, and may also have other similar structures in addition thereto.

Although not shown in FIG. 35, by using the activation indicator, the UE may activate (or receive) a specific CC regarding a specific serving cell index or may deactivate (or not receive) the specific CC.

According to exemplary embodiments of the present invention, a control channel or data channel regarding a component carrier is selectively received depending on whether the component carrier is activated while a deactivated component carrier is not received. Therefore, decoding overhead of a user equipment may be decreased, and power consumption may be decreased.

In addition, a transport protocol regarding activation/deactivation of the component carrier is clearly specified between the user equipment and a base station, and an amount of control information required for this process is regulated. Therefore, a radio resource can be effectively used.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for supporting activation/deactivation of component carrier (CC) by a base station (eNB) in a wireless communication system using a plurality of CCs having independently manageable frequency bands, the method comprising:

transmitting, to a user equipment (UE), configuration information for the UE through radio resource control (RRC) signaling, the configuration information indicating a CC through which system information of another CC configured in the UE is received, and the configuration information comprising at least one index to indicate CCs configured in the UE, the CCs configured in the UE being a subset of CCs configurable by the eNB;

determining, for each of the CCs configured in the UE, activation to instruct monitoring for receiving at least one of a control channel and a data channel or deactivation to instruct a stop of the monitoring for receiving at least one of the control channel and the data channel;

setting the determined activation or deactivation to a 1-bit indicator, wherein the activation is set to 1 and the deactivation is set to 0; and transmitting medium access control (MAC) signaling comprising indicators for the CCs configured in the UE in a bit-stream consisting of eight bits to the UE, wherein the bit-stream comprises at least one reserved bit not available for the indicators for the CCs configured in the UE, and wherein remaining bits of the bit-stream correspond to the indicators for the CCs configured in the UE.

2. The method of claim 1, wherein the bit-stream has a bitmap format, and respective indices of the CCs are mapped in a one-to-one manner to bits located in specific positions in the bitmap.

3. The method of claim 2, wherein each of the CCs is a CC configured in the UE, and wherein the CC is a cell to transmit and receive information between the eNB and the UE, and the cell has a linkage between an uplink CC and a downlink CC.

4. The method of claim 1, wherein, in the determining of activation or deactivation, at least one of a power characteristic of the UE, a radio frequency (RF) device characteristic, a baseband transmission/reception scheme, a number of antennas, a link capacity, which comprises receive power or interference power or noise power or a sum of two power levels or a ratio of the receive power to the interference power or a ratio of the receive power to the interference power and the noise power in the UE, and an available CC is determined by considering at least one of an independent resource usage rate corresponding to each of the control channel and the data channel of the eNB, battery power consumption considering the number of CCs of the UE, a diversity gain, and system reliability considering the number of CCs of the eNB.

5. A method for supporting activation/deactivation of component carrier (CC) by a user equipment (UE) in a wireless communication system using a plurality of CCs having independently managed frequency bands, the method comprising:

receiving, at the UE, configuration information transmitted from a base station (eNB) through radio resource control (RRC) signaling, the configuration information indicating a CC through which system information of another CC configured in the UE is received, and the configuration information comprising at least one index to indicate CCs configured in the UE, the CCs configured in the UE being a subset of CCs configurable by the eNB;

receiving medium access control (MAC) signaling comprising indicators configured for the CCs configured in the UE in a bit-stream consisting of eight bits;

confirming the indicator set for each of the CCs configured in the UE in the bit-stream;

activating a corresponding CC if the confirmed indicator is 1 or deactivating the corresponding CC if the confirmed indicator is 0; and receiving at least one of a control channel and a data channel by monitoring the activated CC or not receiving at least one of the control channel and the data channel by stopping monitoring of the deactivated CC, wherein the bit-stream comprises at least one reserved bit not available for the indicators for the CCs configured in the UE, and wherein remaining bits of the bit-stream correspond to the indicators for the CCs configured in the UE.

6. The method of claim 5, wherein the bit-stream has a bitmap format, and respective indices of the CCs are mapped in a one-to-one manner to bits located in specific positions in the bitmap.

7. The method of claim 5, wherein each of the CCs is a CC configured in the UE, and wherein the CC is a cell to transmit and receive information between the eNB and the UE, and the cell has a linkage between an uplink CC and a downlink CC.

8. A base station (eNB) for supporting activation/deactivation of component carrier (CC) in a wireless communication system using a plurality of CCs having independently manageable frequency bands, the eNB comprising:

a transceiver to transmit, to a user equipment (UE), configuration information for the UE through radio resource control (RRC) signaling, the configuration information indicating a CC through which system information of another CC configured in the UE is received, and the configuration information comprising at least one index to indicate CCs configured in the UE, the CCs configured in the UE being a subset of CCs configurable by the eNB; and a controller to determine, for each of the CCs configured in the UE, activation to instruct monitoring for receiving at least one of a control channel and a data channel or deactivation to instruct a stop of the monitoring for receiving at least one of the control channel and the data channel, and to set the determined activation or deactivation to a 1-bit indicator, wherein the activation is set to 1 and the deactivation is set to 0, wherein the transceiver transmits medium access control (MAC) signaling comprising indicators for the CCs configured in the UE in a bit-stream consisting of eight bits, to the UE, wherein the bit-stream comprises at least one reserved bit not available for the indicators for the CCs configured in the UE, and wherein remaining bits of the bit-stream correspond to the indicators for the CCs configured in the UE.

9. The eNB of claim 8, wherein the controller controls the bit-stream to have a bitmap format and respective indices of the CCs are mapped in a one-to-one manner to bits located in specific positions in the bitmap.

10. The eNB of claim 8, wherein each of the CCs is a CC configured in the UE, and wherein the CC is a cell to transmit and receive information between the eNB and the UE, and the cell has a linkage between an uplink CC and a downlink CC.

11. The eNB of claim 8, wherein the controller determines at least one of a power characteristic of the UE, a radio frequency (RF) device characteristic, a baseband transmission/reception scheme, a number of antennas, a link capacity, which comprises receive power or interference power or noise power or a sum of two power levels or a ratio of the receive power to the interference power or a ratio of the receive power to the interference power and the noise power in the UE, and an available CC by considering at least one of an independent resource usage rate corresponding to each of the control channel and the data channel of the eNB, battery power consumption considering the number of CCs of the UE, a diversity gain, and system reliability considering the number of CCs of the eNB.

12. A user equipment (UE) to support activation/deactivation of component carrier (CC) in a wireless communication system using a plurality of CCs having independently manageable frequency bands, the UE comprising:
- a reception processing unit to receive configuration information transmitted from a base station (eNB) through radio resource control (RRC) signaling, the configuration information indicating a CC through which system information of another CC configured in the UE is received, and the configuration information comprising at least one index to indicate CCs configured in the UE, the CCs configured in the UE being a subset of CCs configurable by the eNB, and to receive medium access control (MAC) signaling comprising indicators configured for the CCs configured in the UE in a bit-stream consisting of eight bits;
- an activation group confirmation unit to confirm the indicator set for each of the CCs configured in the UE in the bit-stream, and to activate a corresponding CC if the confirmed indicator is 1 or deactivate the corresponding CC if the confirmed indicator is 0; and
- an information analysis unit to receive at least one of a control channel and a data channel by monitoring the activated CC or not to receive at least one of the control channel and the data channel by stopping monitoring of the deactivated CC,
- wherein the bit-stream comprises at least one reserved bit not available for the indicators for the CCs configured in the UE, and
- wherein remaining bits of the bit-stream correspond to the indicators for the CCs configured in the UE.

13. The UE of claim 12, wherein the activation group confirmation unit confirms that the bit-stream has a bitmap format and respective indices of the CCs are mapped in a one-to-one manner to bits located in specific positions in the bitmap.

14. The UE of claim 13,
- wherein each of the CCs is a CC configured in the UE, and
- wherein the CC is a cell to transmit and receive information between the eNB and the UE, and the cell has a linkage between an uplink CC and a downlink CC.

* * * * *